United States Patent [19]
Ueyama et al.

[11] Patent Number: 5,675,444
[45] Date of Patent: Oct. 7, 1997

[54] LENS BARREL HAVING A PIEZOELECTRIC ACTUATOR FOR MOVING OPTICAL ELEMENTS

[75] Inventors: Masayuki Ueyama, Takarazuka; Minoru Kuwana, Osaka; Hideki Nagata, Sakai, all of Japan

[73] Assignee: Minolta Co., Ltd., Osaka, Japan

[21] Appl. No.: 681,573

[22] Filed: Jul. 23, 1996

[30] Foreign Application Priority Data

| Jul. 27, 1995 | [JP] | Japan | 7-210237 |
| Jul. 27, 1995 | [JP] | Japan | 7-210238 |
| Jul. 27, 1995 | [JP] | Japan | 7-210239 |

[51] Int. Cl.⁶ .................................................. G02B 7/02
[52] U.S. Cl. ........................................ 359/824; 359/814
[58] Field of Search ........................... 359/814, 824, 359/823, 813, 696

[56] References Cited

U.S. PATENT DOCUMENTS

| 4,003,059 | 1/1977 | Sugiura | 346/108 |
| 4,195,243 | 3/1980 | Thaxter | 310/317 |
| 4,303,324 | 12/1981 | Marcus | 354/195 |
| 4,601,539 | 7/1986 | Watanabe | 359/824 |
| 4,894,579 | 1/1990 | Higuchi et al. | 310/328 |
| 5,225,941 | 7/1993 | Saito et al. | 359/824 |
| 5,448,328 | 9/1995 | Suzuki | 354/400 |
| 5,490,015 | 2/1996 | Umeyama | 359/824 |

*Primary Examiner*—Georgia Y. Epps
*Assistant Examiner*—Ricky Mack
*Attorney, Agent, or Firm*—Burns, Doane, Swecker & Mathis, LLP

[57] ABSTRACT

The present invention discloses a lens barrel moving an optical system by a linear actuator using a piezoelectric element. The actuator is provided with the constitution whereby a driving member is driven by an extension displacement and a contraction displacement having different velocities caused by applying drive pluses to the piezoelectric element and a driven member frictionally connected to the driving member is linearly moved. The focusing operation is conducted by moving the optical system directly in the optical axis direction by the linear actuator.

21 Claims, 21 Drawing Sheets

5,675,444

LENS BARREL HAVING A PIEZOELECTRIC ACTUATOR FOR MOVING OPTICAL ELEMENTS

BACKGROUND OF THE INVENTION

1. Field of the Invention

The present invention relates to a lens barrel, particularly to a lens barrel using a piezoelectric actuator for moving optical elements such as lens sets or reflecting mirrors constituting an optical system and particularly to the structure of the actuator.

2. Description of the Prior Art

A conventional zoom lens is constituted by lens sets exclusive for zooming and lens sets exclusive for focusing. However, in recent years a zoom lens referred to as "varifocal optical system" in which the functions of lens sets are not classified such as exclusive for zooming or exclusive for focusing and lens sets for zooming are also used for focusing by which the zoom ratio can be increased and the closest photographing distance can be decreased, has been developed.

FIG. 24 illustrates a conventional zoom lens of the vari-focal optical system indicating a sectional view taken along the optical axis direction. In FIG. 24, numeral 101 designates an outer lens tube, numeral 102 designates a zoom ring that is rotatable on the outer lens tube 101 and numeral 103 designates an inner fixed tube that is fixed to the outer lens tube 101. A zoom cam ring 104 is fitted on the outer side of the inner fixed tube 103. An annular groove 104a is formed at the vicinity of an end of the zoom cam ring 104, the annular groove 104a is engaged with an annular protrusion 103a that is formed on the outer side of the inner fixed tube 103 and the zoom cam ring 104 is supported on the outer side of the inner fixed tube 103 rotatably and unmovably in the optical axis direction.

The zoom lens is constituted by four lens sets where a first lens set L1 is held by a lens holder 105, a second lens set L2 is held by a lens holder 106, a third lens set L3 is held by a lens holder 107 and a fourth lens set L4 is held by a lens holder 108, respectively.

A pin 104p is provided at the vicinity of an end of the zoom cam ring 104 and the pin 104p is engaged with the zoom ring 102 by which the rotational operation of the zoom ring 102 is transmitted to the zoom cam ring 104. A pin 105p provided at the lens holder 105 for the first lens set L1, is disposed at an intersection of a cam groove 104c of the zoom cam ring 104 and an axial groove 103b of the inner fixed tube 103, penetrates through the cam groove 104c of the zoom cam ring 104 and is engaged with the axial groove 103b of the inner fixed tube 103. Under this construction the rotation of the zoom cam ring 104 by the rotational operation of the zoom ring 102, moves the pin 105p along the axial groove 103b of the inner fixed tube 103 and moves the first lens set L1 held by the lens holder 105 in the optical axis direction.

A pin 107p is provided at the lens holder 107 of the third lens set L3, penetrates through an axial groove 103d of the inner fixed tube 103 and is engaged with a cam groove 104d of the zoom cam ring 104. Under this construction the rotation of the zoom cam ring 104, moves the pin 107p along the axial groove 103d of the inner fixed tube 103 and moves the third lens set L3 held by the lens holder 107.

Further, a zoom cam ring 109 is fitted on the outer side of the lens holder 107 for the third lens set L3. An annular protrusion 109a is formed at the vicinity of an end of the zoom cam ring 109, the annular protrusion 109a is engaged with an annular groove 107a that is formed on the outer side of the lens holder 107 and the zoom cam ring 109 is supported on the outer side of the lens holder 107 rotatably and movably in the optical axis direction together with the lens holder 107.

A pin 104q provided at the vicinity of an end of the zoom cam ring 104 is engaged with an axial groove 109b of the zoom cam ring 109 and the rotation of the zoom cam ring 104 is transmitted to the zoom cam ring 109 whereby the zoom cam ring 109 is rotated. A pin 108p is provided at the lens holder 108 for the fourth lens set L4, penetrates through an axial groove 107b of the lens holder 107 for the third lens set L3 and is engaged with a cam groove 109c of the zoom cam ring 109. Under this construction the rotation of the zoom cam ring 104 is transmitted to the zoom cam ring 109 via the pin 104q, the rotation of the zoom cam ring 109, linearly moves the pin 108p of the lens holder 108 for the fourth lens set L4 along the axial groove 107b of the lens holder 107 and moves the fourth lens set L4 with respect to the lens holder 107.

A mounting unit 110 for mounting the lens barrel to the camera body is formed and a coupler 111 for connecting the lens barrel to a drive mechanism that is arranged on the camera body side for driving the lens sets to an in-focus position based on the defocus value detected by a focus detecting device on the camera body side, are arranged at the right end of the outer lens tube 101. A pinion 111a of the coupler 111 is in mesh with a gear formed on the outer side of a helicoidal ring 112 having a helicoidal screw 112a on its inner face whereby the rotation of the coupler 111 rotates the helicoidal ring 112. Also, an end 113b of a manual operation ring 113 arranged on the inner side of the outer lens tube 101, is engaged with a pin 112b that is implanted on the helicoidal ring 112 whereby the helicoidal ring 112 can be rotated by rotating the manual operation ring 113.

A focus cam ring 114 is inserted onto the inner side of the inner fixed tube 103 and a helicoidal screw 114a is formed at an end thereof and the helicoidal screw 114a is in mesh with the helicoidal screw 112a of the helicoidal ring 112.

A pin 106p is provided at the lens holder 106 for the second lens set L2, penetrates through a cam groove 114p of the focus cam ring 114 and an axial groove 103e of the inner fixed tube 103 and is engaged with a cam groove 104e of the zoom cam ring 104.

According to the above-mentioned constitution, when the helicoidal ring 112 is rotated by rotating the coupler 111, the focus cam ring 114 that is connected to the helicoidal ring 112 via the helicoidal screws and the lens holder 106 that is connected to the focus cam ring 114 via the pin 106p, can be moved in the optical axis direction by which the second lens set L2 can be moved in the optical axis direction. The lens holder 106 that is connected to the zoom cam ring 104 via the pin 106p can be moved in the optical axis direction by which the second lens set L2 can be moved in the optical axis direction, also by the rotation of the zoom cam ring 104.

FIG. 25 is a sectional view of a conventional lens barrel of a reflecting telescopic lens capable of focusing automatically. In FIG. 25, numeral 201 designates a first lens, numeral 221 designates a primary mirror, notation 221a designates a reflecting face formed at the back face of the primary mirror 221, numeral 202 designates a secondary mirror, notation 202a designates a reflecting face formed at the back face of the secondary mirror 202, numeral 222 designates a second lens and numeral 223 designates a third lens. A focusing lens set 203 including the first lens 201 and the secondary mirror 202, is held by a helicoidal ring 204. A gear is installed at the outside of the optical axis to be in mesh with a pinion gear 212 of a reduction gear mechanism 207 that is connected to a AF coupler 208 receiving a driving force from the camera body side, not shown, for transmitting rotation via a focusing-driven ring 205 and a distance scale ring 206.

The reduction gear mechanism 207 is constituted by a coupler gear 210 installed on a drive shaft 209, an intermediate gear 211 and the pinion gear 212.

Bearings for the pinion gear 212 and the intermediate gear 211 are installed in a primary mirror holder 215 and a bearing portion receiving the distance scale ring 206 is also provided therein. Other bearings supporting axes of the pinion gear 212 and the intermediate gear 211 are provided at a gear base plate 213 by which they are fixed to the lens barrel.

The driving force from the camera body side is transmitted to the reduction gear mechanism 207 via the AF coupler 208, the drive shaft 209 and the coupler gear 210, rotates the helicoidal ring 204 via the focusing-driven ring 205 and moves the focusing lens set 203 in the optical axis direction whereby the focusing operation is conducted.

As has been explained, according to the zoom lens in the conventional vari-focal optical system or the reflecting telescopic lens of the automatic focusing system, the coupler for connecting the lens barrel to a motor that is driven by a defocus signal detected by the focus detecting device on the camera body side, is installed on the lens barrel side and the helicoidal ring is rotated by the rotation of the coupler by which predetermined lens sets are moved to the in-focus positions.

However, according to such a constitution, the rotational motion of the helicoidal ring is converted into a linear motion of the focus cam ring in the optical axis direction by the helicoidal screws and accordingly, the constitution is complicated which, as a result, gives rise to the inconvenience of an increase in the number of parts and an increase in weight etc. and improvement therefor has been requested.

Further, for example, with respect to a telescopic lens barrel of a reflecting type, in the case where an actuator is used for moving lens sets contributing to focusing such as a secondary mirror, for the purpose of the focusing, the actuator must be arranged in the vicinity of an optical path that is incident on or reflected by the lens sets due to structural restriction. Therefore, the optical path that is incident on or reflected by the lens sets may be blocked depending on the constitution of the actuator.

Furthermore, when an actuator that is arranged in a lens barrel is used for moving lens sets contributing to focusing, it is requested that a drive circuit for driving the actuator is arranged in the lens barrel without enlarging outer dimensions of the lens barrel.

Also, when an actuator that is arranged in a lens barrel is used for moving lens sets contributing to focusing, it is requested that a drive circuit for driving the actuator is arranged in the lens barrel and electric wiring for connecting the actuator to the drive circuit does not influence an optical path passing through the lens barrel.

SUMMARY OF THE INVENTION

It is a main object of the present invention to provide a lens barrel having an improved drive mechanism for an optical system.

It is another object of the present invention to provide a small-sized and light-weighted lens barrel having an optical system drive mechanism using a small-sized and light-weighted actuator.

It is another object of the present invention to provide a lens barrel having a novel optical system drive mechanism in which a linear driving actuator using a piezoelectric element and its drive circuit are arranged inside of the lens barrel whereby an optical system is driven.

The above-mentioned and other objects and novel characteristics of the present invention will be clarified by the following detailed explanation in reference to the drawings.

DETAILED DESCRIPTION OF THE PREFERRED EMBODIMENTS

An explanation will be given of embodiments of the present invention as follows.

(1) General Construction

Figure 1:
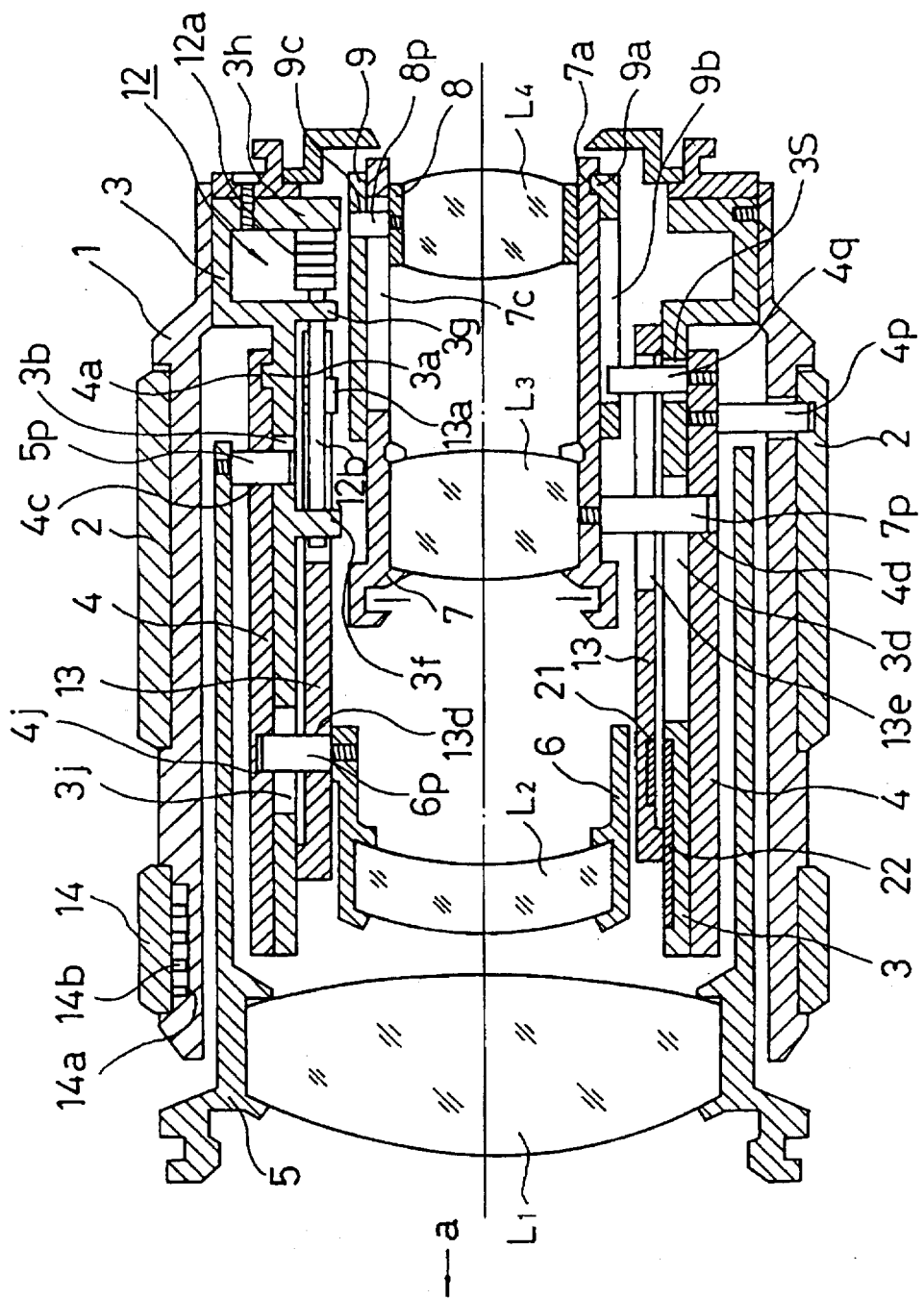
FIG. 1 is a sectional view showing the constitution of a zoom lens barrel of a first embodiment according to the present invention.
Figure 2:
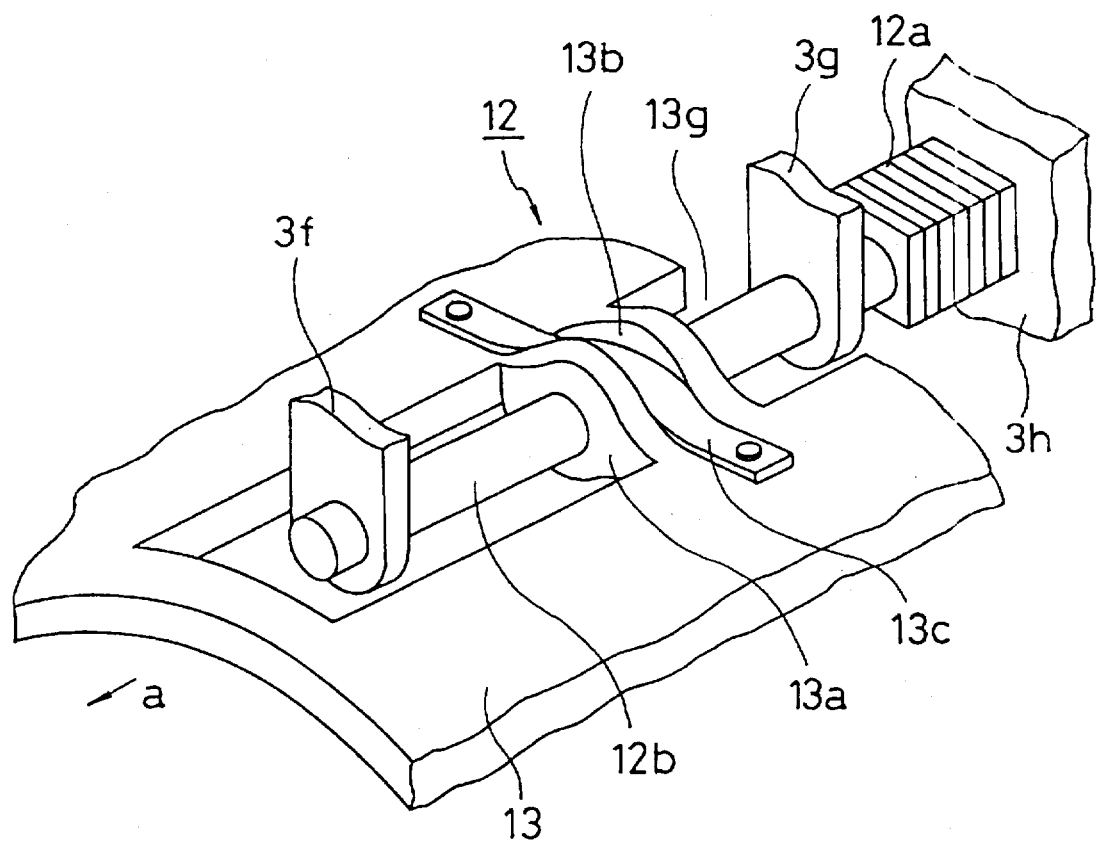
FIG. 2 is a perspective view enlarging a drive mechanism of the lens barrel in FIG. 1.

FIG. 1 and FIG. 2 show the zoom lens barrel based on the first embodiment of this invention, of which FIG. 1 is a cross-sectional view taken along the optical axis of the lens barrel, and FIG. 2 is a perspective view of the drive mechanism which is based on a piezoelectric actuator.

In FIG. 1, indicated by 1 is an outer lens tube, 2 is a zoom ring which is fitted rotatably around the outer lens tube 1, and 3 is an inner fixed tube which is fixed to the tube 1. A zoom cam ring 4 is fitted around the inner fixed tube 3. Formed at one end of the zoom cam ring 4 is an annular groove 4a, which engages with an annular protrusion 3a formed around the inner fixed tube 3 so that the zoom cam 4 is supported only rotatably around the inner fixed tube 3, and it is not moved in the optical axis direction.

The zoom lens consists of first through fourth lens sets L1, L2, L3 and L4, which are held by lens holders 5, 6, 7 and 8, respectively. Provided at one end of the zoom cam ring 4 is a pin 4p, which engages with the zoom ring 2, and the rotation of the zoom ring 2 is transmitted to the zoom cam ring 4. A pin 5p, which is provided on the holder 5 of the first lens set L1 by being located at the intersection of the cam groove 4c of the zoom cam ring 4 and the axial groove 3b of the inner fixed tube 3, runs through the zoom cam ring 4 and engages with the axial groove 3b of the inner fixed tube 3. Based on this arrangement, the turning zoom cam ring 4, which is driven by the operation of the zoom ring 2, moves the pin 5p along the axial groove 3b of the inner fixed tube 3, and the first lens set L1 held by the holder 5 is moved in the axial direction.

The holder 7 of the third lens set L3 has a pin 7p, which runs through a groove 13e of focus cam ring 13 (will be explained shortly), further runs through an axial groove 3d of the inner fixed tube 3, and engages with a cam groove 4d of the zoom cam ring 4. Based on this arrangement, the turning zoom cam ring 4 moves the pin 7p along the axial groove 3d of the inner fixed tube 3, and the third lens set L3 held by the holder 7 is moved in the axial direction.

A zoom cam ring 9 is fitted around the holder 7 of the third lens set L3. Formed at one end of the zoom cam ring 9 is an annular protrusion 9a, which engages with an annular groove 7a formed around the holder 7 so that the zoom cam ring 9 is supported rotatably around the holder 7 and movable together with the holder 7 in the axial direction.

A pin 4q, which is provided at one end of the zoom cam ring 4, runs through a slit 3s of the inner fixed tube 3 and engages with an axial groove 9b of the zoom cam ring 9, and consequently the rotation of the zoom cam ring 4 is transmitted to the zoom cam ring 9 to turn it. The holder 8 of the fourth lens set L4 has a pin 8b, which runs through an axial groove 7c of the holder 7 of L3 and engages with a cam groove 9c of the zoom cam ring 9.

Based on this arrangement, the rotation of the zoom cam ring 4 is transmitted to the zoom cam ring 9 through the pin 4q, and the rotation of the zoom cam ring 9 moves the pin 8p of the holder 8 of L4 along the axial groove 7c. Consequently, the fourth lens set L4 is moved in the axial direction with respect to the holder 7. The rotation of the zoom cam ring 4 also moves the third lens set L3 held by the holder 7 in the axial direction as mentioned previously.

A piezoelectric actuator 12, which drives the focus cam ring 13, is disposed at one end of the inner fixed tube 3. The arrangement of the piezoelectric actuator 12 will be explained with reference to FIG. 1 and FIG. 2. The inner fixed tube 3 has in it two support members 3f and 3g, which supports a drive shaft 12b movably in the axial direction. A piezoelectric element 12a has its one end glued to the end of the drive shaft 12b and another end glued to a flange 3h of the inner fixed tube 3. A variation of thickness of the piezoelectric element 12a cause the drive shaft 12b to have a displacement in the axial direction.

The focus cam ring 13 has the formation of a cutout portion 13g in its right-hand section, and a contactor 13a through which the drive shaft 12b runs is formed near the center of the cutout portion 13g as shown in FIG. 2. The contactor 13a has the formation of a cut 13b through which the drive shaft 12b is exposed, and a flat spring 13c is disposed to bridge the cut 13b over the drive shaft 12b. The drive shaft 12b and flat spring 13c are in press contact and the drive shaft 12b and contactor 13a are also in press contact so that these members are joined to each other based on the friction.

Figure 3:
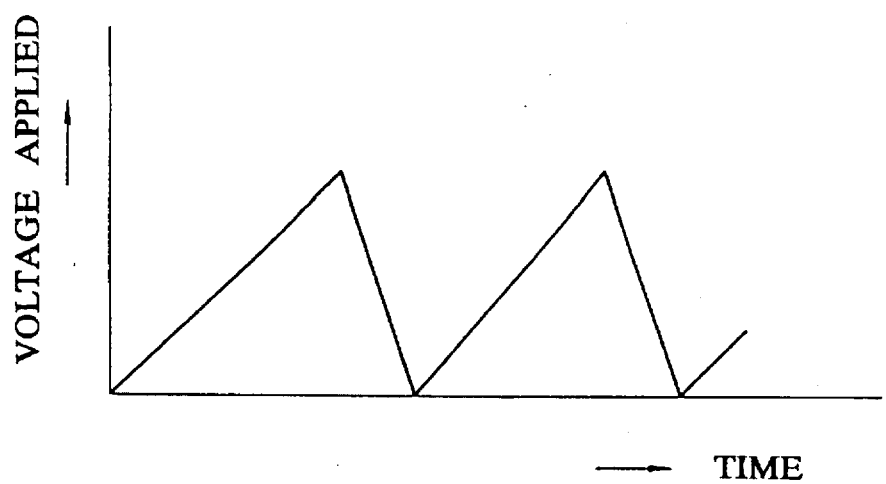
FIG. 3 is a diagram showing an example of a waveform of drive pulses applied on a piezoelectric actuator.

The piezoelectric element 12a is supplied with electric drive pulses having a moderate rising edge and a sharp falling edge as shown in FIG. 3, and a resulting increase of thickness causes the drive shaft 12b to have a displacement in the axial direction. Consequently, the focus cam ring 13 which is joined by friction at the contactor 13a to the drive shaft 12b, is moved in the axial direction as shown by the arrow mark a. The focus cam ring 13 is moved in the opposite direction when drive pulses having a sharp rising edge and a moderate falling edge are supplied to the piezoelectric element 12a.

The holder 6 of the second lens set L2 has a pin 6p, which runs through a cam groove 13d of the focus cam ring 13, further runs through an axial groove 3j of the inner fixed tube 3, and engages with a cam groove 4j of the zoom cam ring 4.

The piezoelectric actuator 12 is activated in response to the defocus value detected by the focus detecting device on the part of the camera body or the operation value of the manual focus ring 14 to move the focus cam ring 13 in the axial direction. Consequently the pin 6p, which runs through the cam groove 13d of the focus cam ring 13, moves the lens holder 6 in the axial direction, causing the second lens set L2 to move in the axial direction by a distance corresponding to the detected defocus value, and it is brought to the infocus position.

The lens holder 6, which is linked to the zoom cam ring 4 by the pin 6p, also moves in the axial direction, and the second lens set L2 can be moved in the axial direction also by the rotation of the zoom cam ring 4 in response to the zooming operation.

The zoom lens barrel based on this embodiment will further be explained in the following.

(2) Adjustment of Focusing

Figure 4:
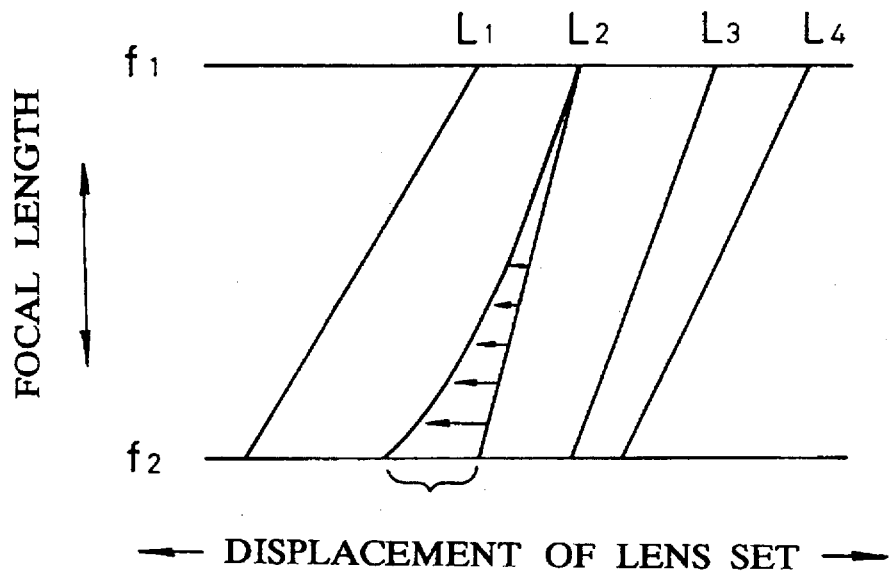
FIG. 4 is a diagram explaining movement loci of lens sets constituting a zoom lens barrel.

FIG. 4 shows the loci of movement of the first through fourth lens sets L1–L4 during the zooming operation. Each lens set moves in response to the variation of the setup focal length f from the wide-angle extreme f1 to the telephoto extreme f2 as shown.

The adjustment of focusing is achieved by varying the amount of displacement of second lens set L2 in nonlinear fashion during the zooming operation in accordance with the focal length f and the object distance D that are set for the lens.

Figure 5:
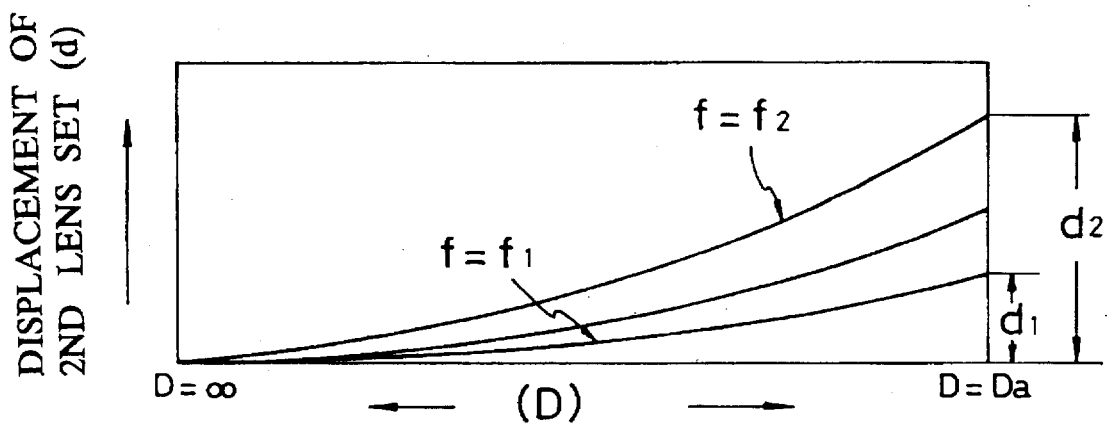
FIG. 5 is a diagram explaining a relation among a focal length, an object distance and an amount of displacement which are set at a second lens set.

FIG. 5 shows the relationship among the setup focal length f and object distance D and the displacement d of the second lens set L2. The closer the object distance to the closest setup position and the closer the setup focal length f to the telephoto position, the greater is the displacement d. Specifically, with the object distance being at the closest position (D=Da), when the focal length f is set to the wide-angle extreme f1, the displacement d is equal to d1, or when the f is set to the telephoto extreme f2, the displacement d is equal to d2.

The shape of the cam groove 4j of the zoom cam ring 4 and the shape of the cam groove 13d of the focus cam ring 13 which move the second lens set L2, and the movement of the pin 6p which is located at the intersection of the grooves 4j and 13d will be explained in connection with the developing diagram of FIG. 6.

Figure 6:
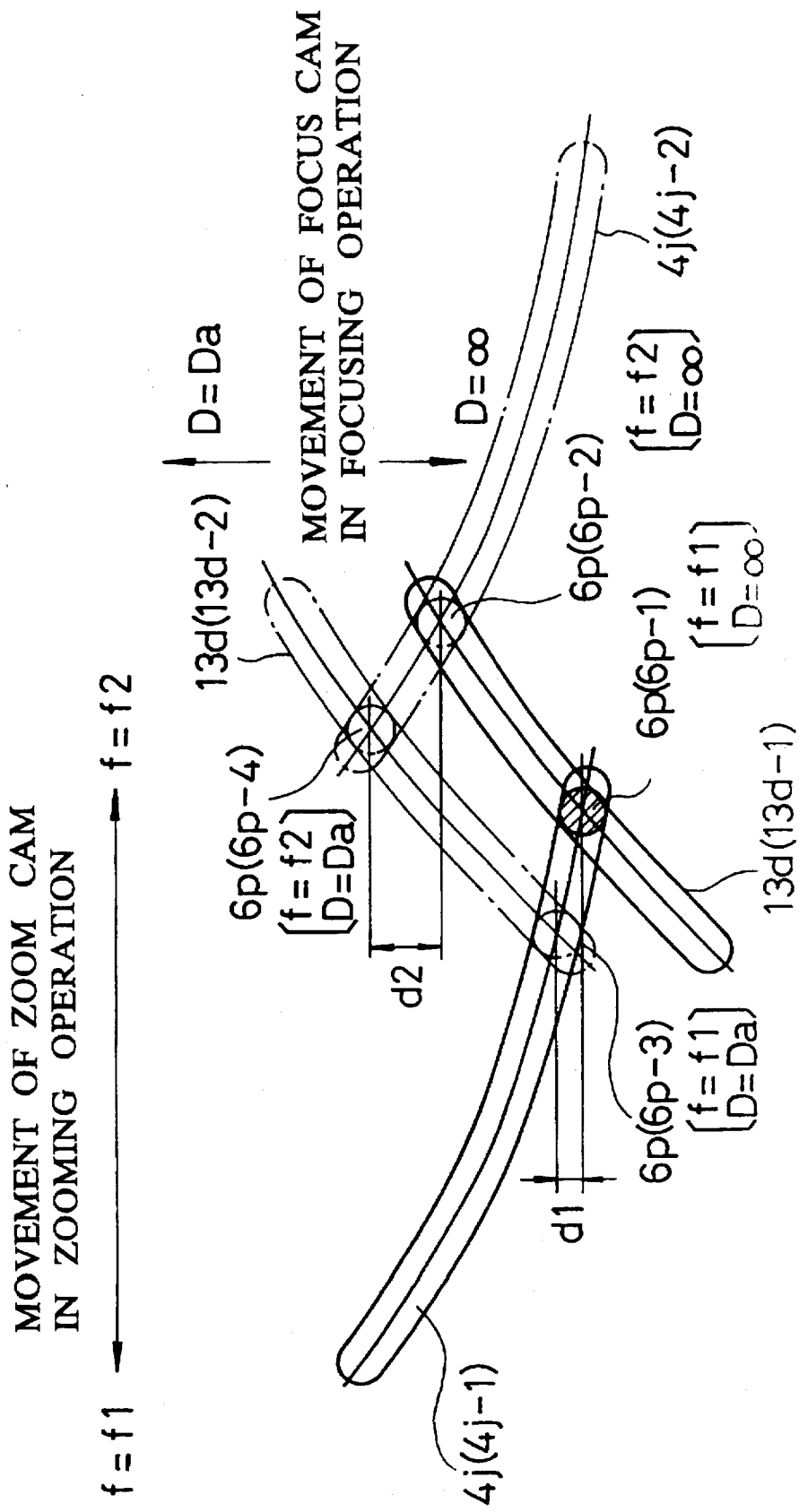
FIG. 6 is a diagram explaining a relation between a focus cam and a zoom cam of the second lens set.

In FIG. 6, the solid line shows the position 4j-1 of the cam groove 4j of the zoom cam ring 4 and the position 13d-1 of the cam groove 13d of the focus cam ring 13 when focal length f is set to the wide-angle extreme f1 and the object distance D is set to the infinity position (D=∞). The dash-dot line shows the position 4j-2 of the cam groove 4j of the zoom cam ring 4 and the position 13d-2 of the cam groove 13d of the focus cam ring 13 when focal length f is set to the telephoto extreme f2 and the object distance D is set to the closest position (D=Da).

Namely, in the zooming operation, with the object distance D being set to the infinity position (D=∞) and the focal length f being set to the wide-angle extreme f1, the operation of the zoom cam ring 4 toward the telephoto position causes the cam groove 4j of the zoom cam ring 4 to move from position 4j-1 to position 4j-2 (rightward in FIG. 6). The focus cam ring 13 does not move at this time, and the pin 6p moves from position 6p-1 to position 6p-2 to implement the zooming.

In the focusing operation, with the focal length f being set to the wide-angle extreme f1 and the object distance D being set to the infinity position (D=∞), the operation of the focus cam ring 13 toward the closer distance causes the cam groove 13d of the focus cam ring 13 to move from position 13d-1 to position 13d-2 (upward in FIG. 6). The focus cam ring 4 does not move at this time, and the pin 6p moves from position 6p-1 to position 6p-3 (displacement d=d1) to implement the intended focusing.

With the focal length f being set to the telephoto extreme f2 and the object distance D being set to the infinity position (D=∞), the operation of the focus cam ring 13 toward the closer distance causes the cam groove 13d of the focus cam ring 13 to move from position 13d-1 to position 13d-2 (upward in FIG. 6). The zoom cam ring 4 does not move at this time, and the pin 6p moves from position 6p-2 to position 6p-4 (displacement d=d2) to implement the intended focusing.

Although the amount of movement of the focus cam ring 13 from the infinity position (D=∞) to the closest position (D=Da) is constant, the amount of displacement of the pin 6p, i.e., the second lens set L2, is d=d1 for the focal length f set to the wide-angle extreme, or it is d=d2 for the f set to the telephoto extreme f2, and accordingly the amount of displacement of the second lens set L2 is modified depending on the object distance.

For example, with the object distance D being set to the closest position (D=Da), when the zoom cam ring 4 is turned from the wide-angle extreme f1 to the telephoto extreme f2, the pin 6p moves from position 6p-3 to 6p-4 to provide a displacement of d=d2 for the second lens set L2, and consequently the infocus condition is not disturbed by the zooming operation.

As described above, the inventive zoom lens, although it is based on the vari-focal optical system, implements the focus modification by operating on the focus cam to move the focus-related lens sets during the zooming operation, and therefore it can be used in completely the same manner as usual zoom lenses.

The focus modification function of the inventive zoom lens, which has been explained for the cases of the focal length f set to the wide-angle extreme f1 or telephoto extreme f2 and the object distance D set to the infinity or closest position Da, is equally applied to the modification of displacement of the second lens set L2 when the f and D are set to intermediate values.

(3) Detection of lens position with MR sensor

For the detection of position of the second lens set L2 which is moved during the focusing operation, a position detector based on the ferromagnetic thin-film magnetic resistance (which will be termed "MR sensor" hereinafter) is attached on the focus cam ring 13 and a magnetized rod 22 having N and S poles at a certain spacing is attached on the inner fixed tube 3.

Figure 7:
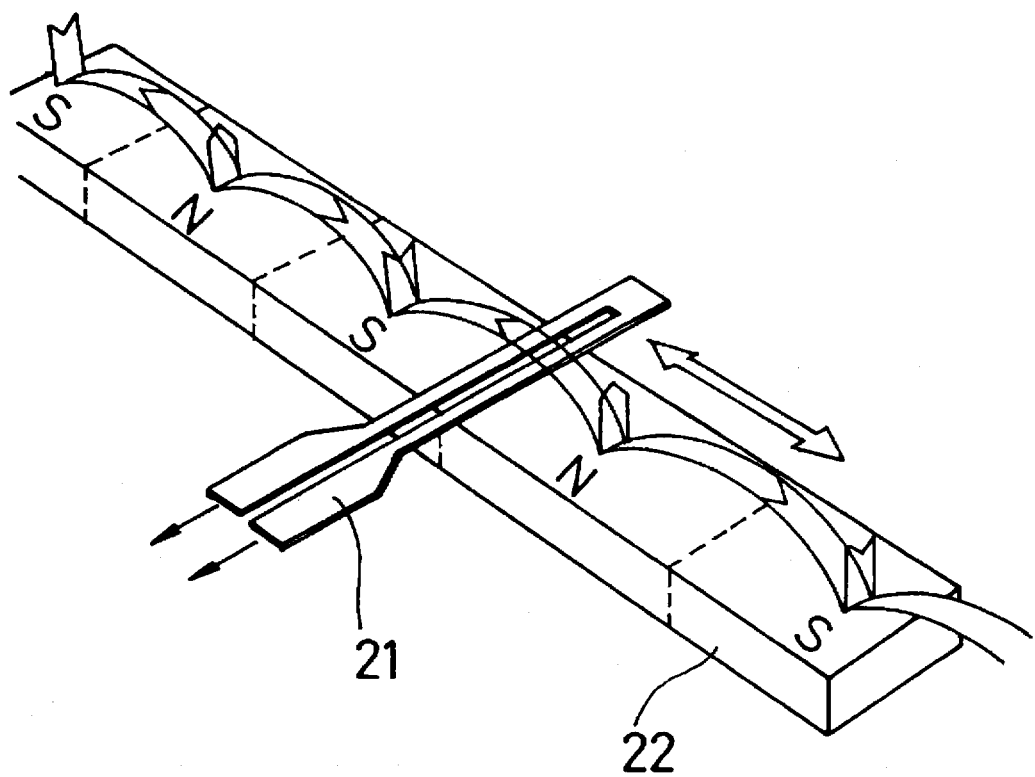
FIG. 7 is an explanatory view of a position detector of a ferromagnetic thin-film magnetic resistance type position detector (MR sensor)

The MR sensor is a non-contact position detector used for the measurement of a relatively long traveling distance or the position of an object, and it consists of a magnetized rod 22 and a magnetic resistance element 21. The principle of the MR sensor will be explained with reference to FIG. 7.

Over a magnetized rod 22 having N and S poles aligned at a certain spacing along the measuring direction, a magnetic resistance element 21 is disposed such that the axis of current is at right angles with the magnetic pole alignment and the element face is in parallel and close to the surface of the magnetized rod. The leakage magnetic flux emerging between each pair of magnetic poles acts on the magnetic resistance element 21, which then exhibits the magnetic resistance effect as follows.

When the magnetic resistance element 21 is located between two poles of the magnetized rod 22, its resistance value decreases due to the magnetic resistance effect attributable to the horizontal component of the leakage magnetic flux, whereas when it is located right above a pole, the resistance value is the same as the case of no magnetic field because of the absence of horizontal component of the leakage magnetic flux over the magnetic pole. The relative movement between the magnetic resistance element 21 and magnetized rod 22 creates a periodic variation of resistance of the magnetic resistance element 21, and accordingly the distance of movement and thus the position of the element 21 can be known by counting resistance variation cycles.

Figure 8:
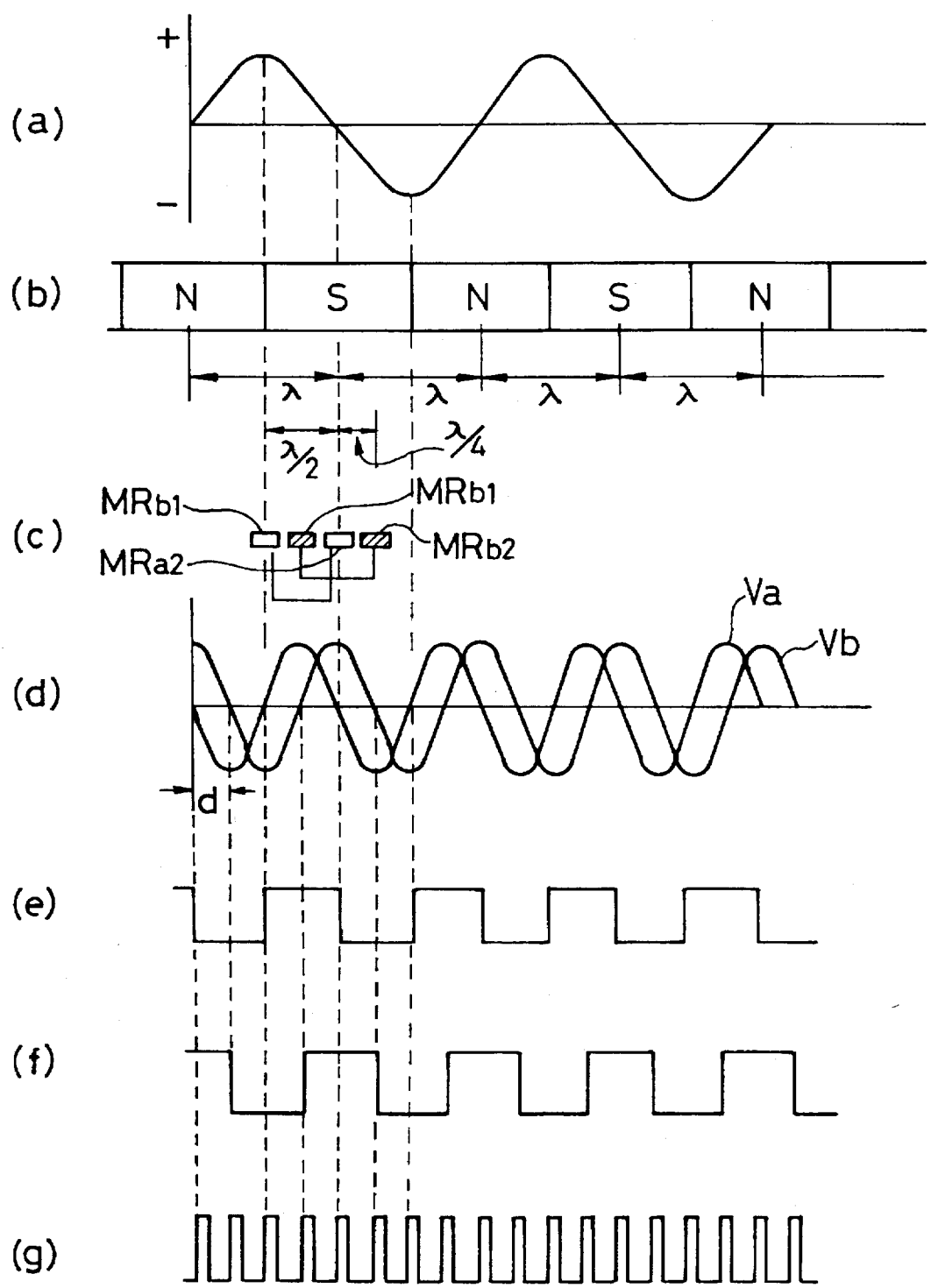
FIG. 8 illustrates the specific arrangement of a pole spacing of a magnetized rod and a magnetic resistance element constituting the MR sensor and its output signal.

FIG. 8 explains the positional relation between the magnetic resistance element 21 and magnetic poles of the magnetized rod 22, and the output signals. Magnetic poles N and S of the magnetized rod 22 have a constant spacing λ as shown by (a) and (b) of FIG. 8, and the resolution of measurement is determined from the dimension of spacing λ between adjacent N and S poles.

The magnetic resistance element 21 is made up of an a-group element pair MRa1 and MRa2 spaced out by λ/2 and a b-group element pair MRb1 and MRb2 spaced out by λ/2, with these element pairs being phased spatially by d (d=λ/4) as shown by (c) of FIG. 8.

Figure 9:
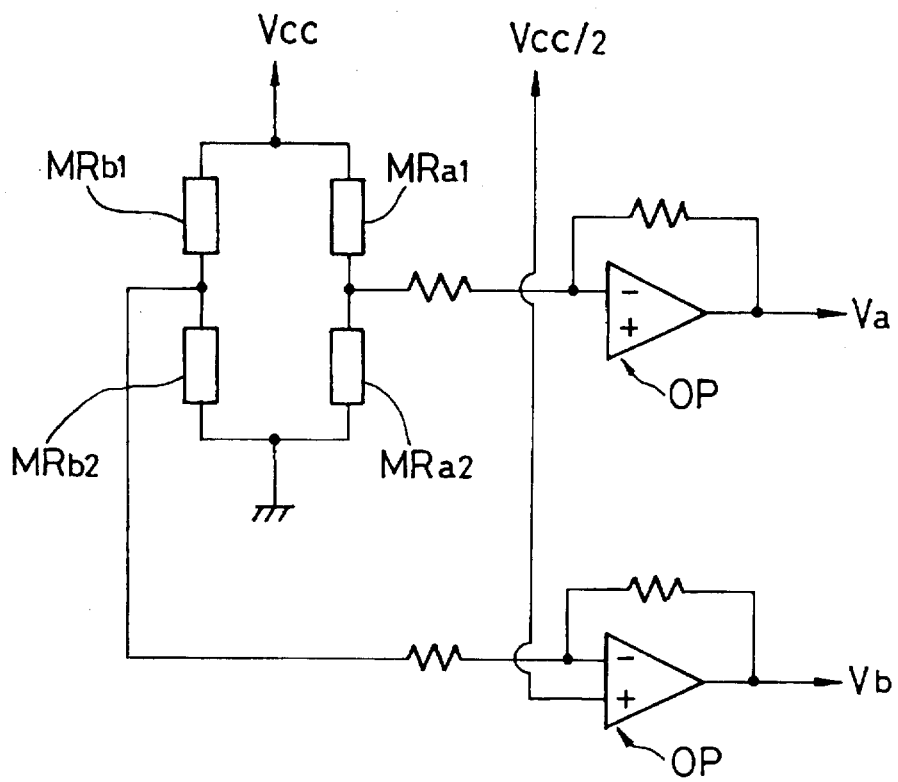
FIG. 9 is a diagram explaining a signal processing circuit of the MR sensor.

The a-group element pair MRa1 and MRa2 and b-group element pair MRb1 and MRb2 produce output signals Va and Vb which are out of phase by d as shown by (d) of FIG. 8. By processing these signals to discriminate the phase relationship with a signal processing circuit as shown in FIG. 9 for example, the moving direction can be known.

The output signals Va and Vb are shaped into pulse signals as shown by (e) and (f) of FIG. 8, and then merged into a pulse train having a pitch of λ/4 as shown by (g) of FIG. 8, and by counting the pulses, the distance of movement can be measured at a resolution of a quarter of the pole spacing λ.

(4) Manual focusing mechanism

This zoom lens barrel employs a power-assisted focusing mechanism in which the rotational angle of the manual focus ring 14 (shown in FIG. 1) is detected electrically also in the manual focusing operation and the piezoelectric actuator 12 is energized to move the focus cam ring 13 in the axial direction.

Figure 10:
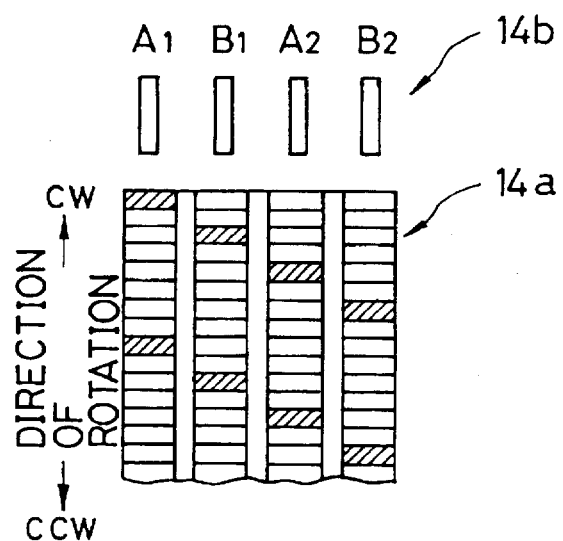
FIG. 10 is a developing diagram of encoder patterns provided on a manual focus ring.

Specifically, for the detection of rotational angle of the manual focus ring 14, a pattern encoder 14a is attached on the outer lens tube 1 and a brush 14b in contact with the encoder 14a (hatched pattern is conductive part) is attached on the ring 14. The use of a pattern encoder as shown in FIG. 10, for example, enables the detection of rotational angle in the form of a 4-bit pulse signal. The produced 4-bit pulse signal is processed by a logical processing circuit shown in FIG. 11, and the circuit yields signals indicative of the rotational direction and rotational angle of the manual focus ring.

Figure 11:
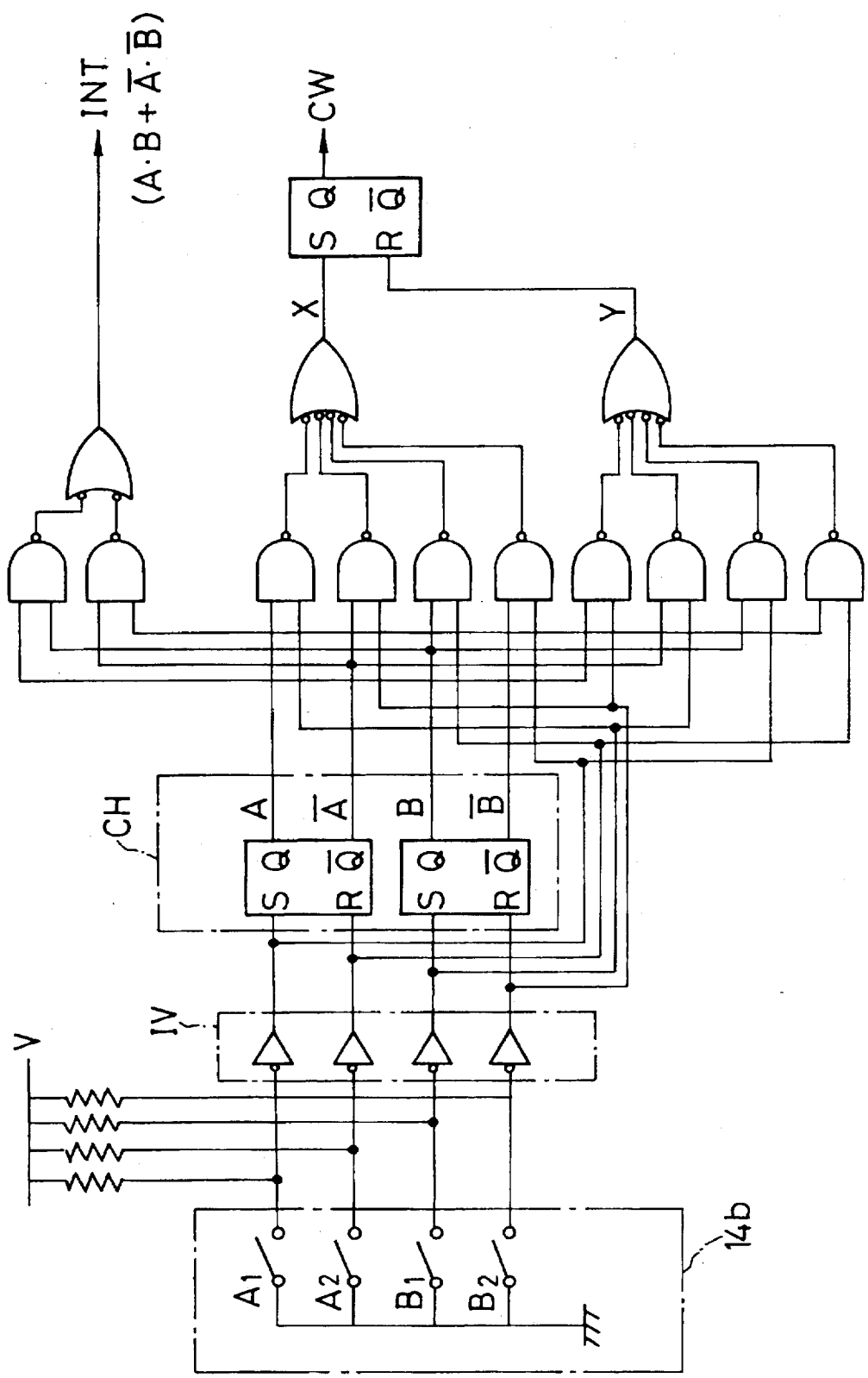
FIG. 11 is a circuit diagram of a logical processing circuit discriminating encoder output of the manual focus ring.
Figure 12:
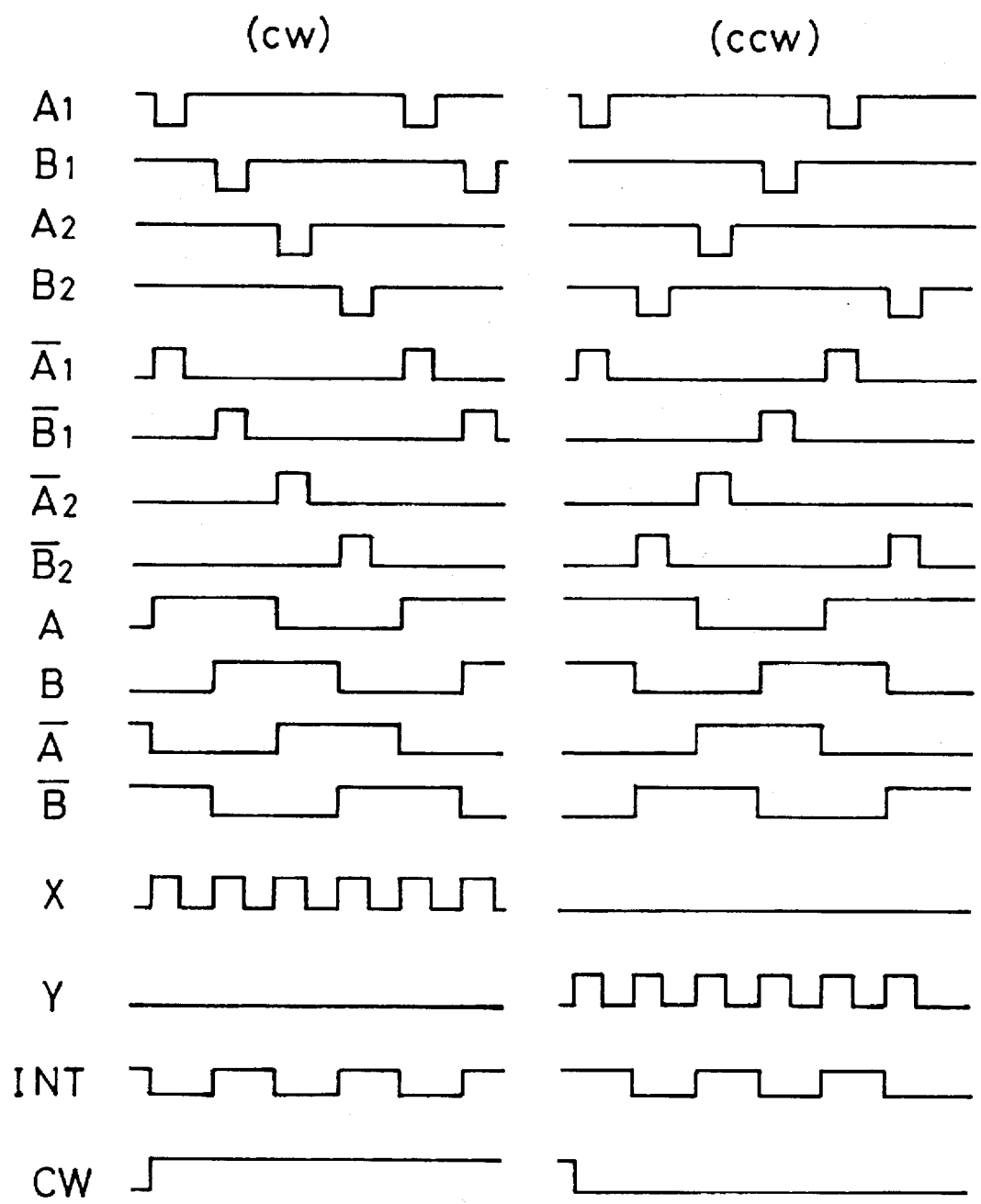
FIG. 12 illustrates diagrams explaining output waveforms from the logical processing circuit in FIG. 11.

FIG. 12 shows the signal waveforms resulting from the process by the logical processing circuit of FIG. 11. The signals include the output signals $\overline{A1}$, $\overline{B1}$, $\overline{A2}$ and $\overline{B2}$ of the four brushes 14b that are in contact with the pattern encoder, the output signals A1, B1, A2 and B2 of the inverter gate IV, the output signals A, $\overline{A}$, B and $\overline{B}$ of the chattering preventive circuit CH consisting of two flip-flops, the output signals X and Y of the logic circuit consisting of AND gates, OR gates and a flip-flop, and the output signals CW and INT indicative of the rotational direction and rotational angle of each of clockwise rotation (CW) and counterclockwise rotation (CCW).

(5) Lens barrel control circuit and control operation

Figure 13:
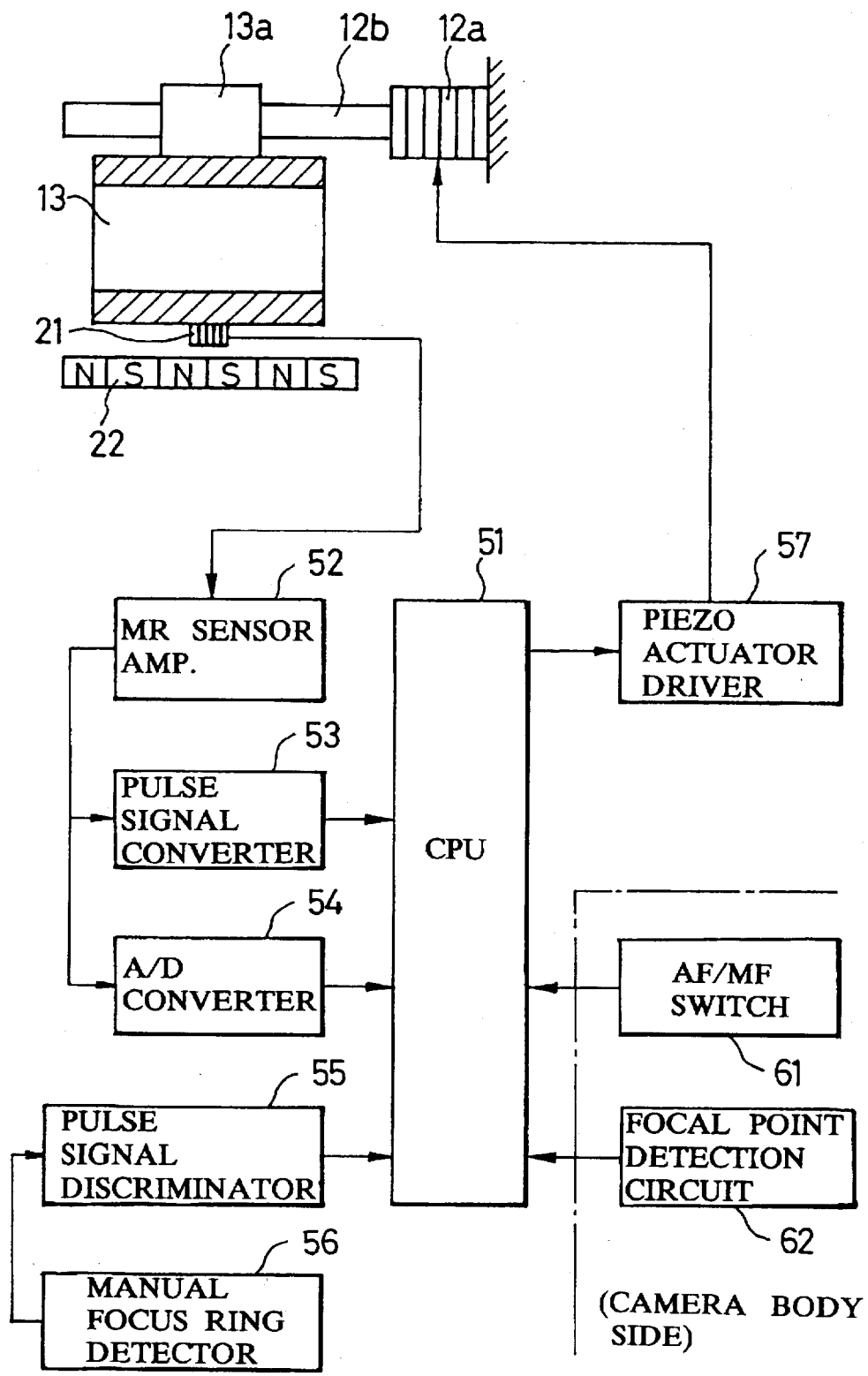
FIG. 13 is a block diagram of a lens barrel control circuit.

FIG. 13 is a block diagram of the lens barrel control circuit. The circuit includes a controller 51 formed of a CPU device, an MR sensor amplifier 52, a pulse signal converter 53 which shapes the output signal of the amplifier, an A/D converter 54, a manual focus ring detector 56 and a pulse signal discriminator 55 which processes the output signal of the detector 56, all connected to the input ports of the controller 51, and a piezoelectric actuator driver 57 connected to the output port of the controller 51. An AF/MF switch 61 for selecting the auto-focus or manual focus mode and a focal point detection circuit 62, both included on the part of the camera body (not shown), are also connected to the input ports of the controller 51.

Next, the operation of the control circuit for focusing the zoom lens to a photographic object will be explained with reference to FIG. 13, FIG. 1. and FIG. 2.

Initially, the controller 51 receives the signal from the AF/MF switch 61 on the camera body, and detects that the switch is set to the AF position for auto-focusing, for example. The controller 51 also receives the defocus signal for the object sent from the focal point detecting circuit 62 in the camera body.

The controller 51 discriminates the defocus signal, and upon detecting that the lens set L2, i.e., the focus cam ring 13, needs to be moved forward (indicated by the arrow mark "a" in FIG. 1), it operates on the piezoelectric actuator driver 57 to generate drive pulses having a moderate rising edge and a sharp falling edge as shown in FIG. 3 thereby to energize the piezoelectric element 12a.

The piezoelectric element 12a extends moderately in its thickness direction during the period of the moderate rising edge of the drive pulse, causing the drive shaft 12b to move forward as shown by the arrow mark "a" in FIG. 2. Consequently, the focus cam ring 13, which is in friction-fitting on the drive shaft 12b by means of the contactor 13a, moves in the direction "a" to move the lens set L2 forward.

The piezoelectric element 12a contracts quickly in its thickness direction during the period of the sharp falling edge of the drive pulse, causing the drive shaft 12b to move backward. In this case, the focus cam ring 13 has the inertia that is large enough to defeat the frictional force on the drive shaft 12b and it is virtually stationary at its position, and the focus cam ring 13 does not move. The expression of the "virtually stationary" focus cam ring 13 mentioned here disregards a momentary slip movement between the contactor 13a and drive shaft 12b in both directions, and the focus cam ring 13 is moved forward throughout the period of drive pulse application to the piezoelectric element 12a.

The focus cam ring 13 is moved backward by the the application of drive pulses having a sharp rising edge and a moderate falling edge to the piezoelectric element 12a.

As the focus cam ring 13 moves, the magnetic resistance element 21 of the MR sensor attached on the focus cam ring 13 is sensitive to the magnetic poles of the magnetic rod 22 attached on the inner fixed tube 3. The detected signals are amplified by the MR sensor amplifier 52, converted into pulse signals by the pulse signal converter 53, and fed to the controller 51. The amplified signals are also delivered to the A/D converter 54, by which the signals are converted into digital data and fed to the controllers 51. The controller 51 implements the calculation of interpolation for the digital data to evaluate the cam position between adjacent magnetic poles, thereby determining the position of the focus cam ring 13 precisely over the entire moving range.

The focus detecting circuit 62 in the camera body detects the in-focus state and sends a signal to the controller 51. In response to the signal, the controller 51 operates on the piezoelectric actuator driver 57 to cease the output of drive pulses, and the focus cam ring 13 stops.

Next, the control operation when the AF/MF switch 61 on the camera body is set to the MF position for manual focusing will be explained. When the manual focus ring 14 is operated, the rotation is detected by the manual focus ring detector 56 made up of the pattern encoder 14a and brush 14b. The resulting pulse signals are processed by the pulse signal discriminator 55, which then produces the signals CW and INT indicative of the direction of operation and the amount of operation of the manual focus ring 14.

Based on these signals, the controller 51 operates on the piezoelectric actuator driver 57 to generate drive pulses having a moderate rising edge and a sharp falling edge, or drive pulses having a sharp rising edge and a moderate falling edge, thereby energizing the piezoelectric actuator.

(6) General construction of a reflecting telescopic lens barrel

Next, an explanation will be given of a reflecting telescopic lens barrel of an automatic focusing type using a piezoelectric actuator in accordance with the present invention.

Figure 14:
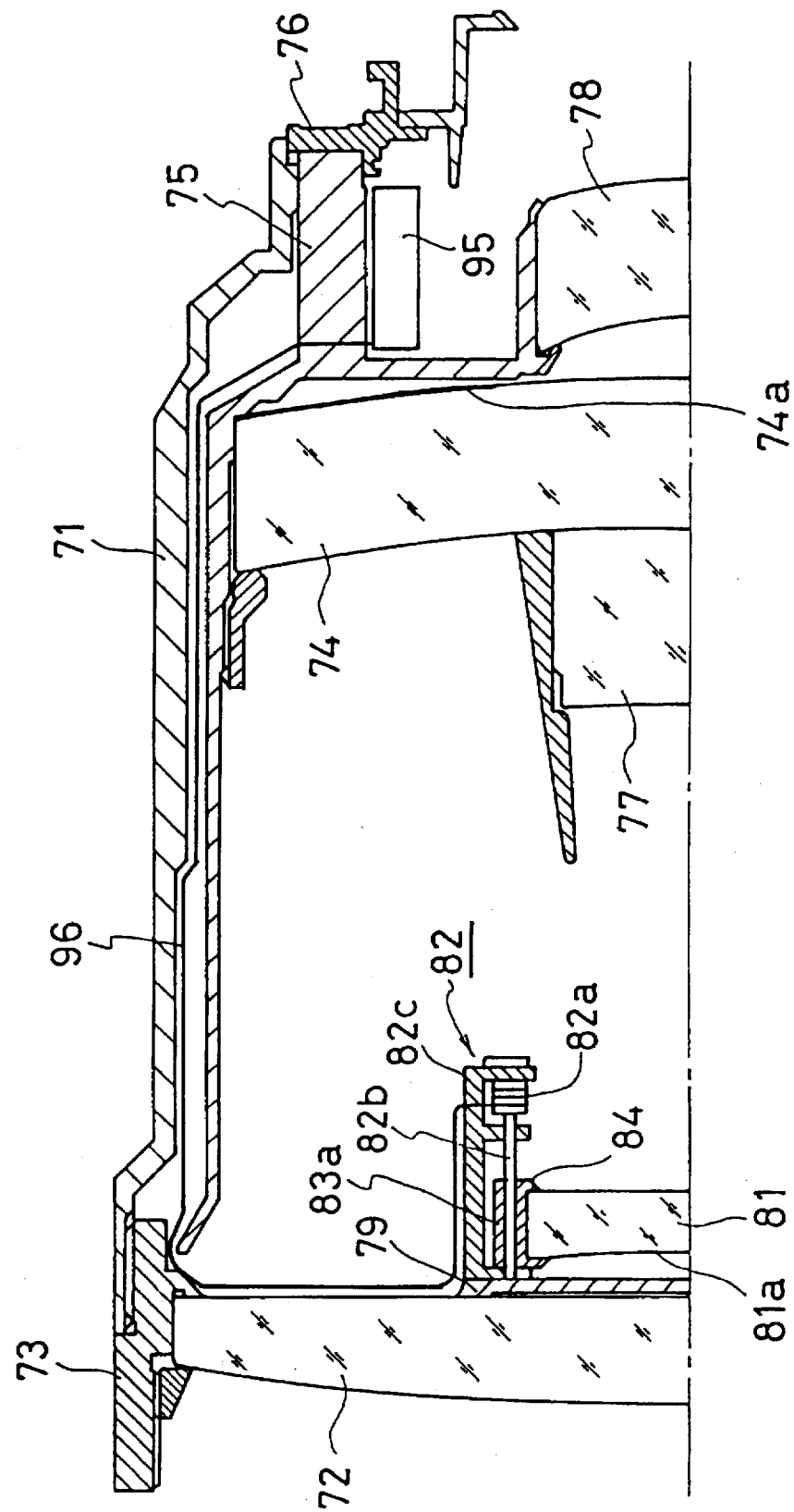
FIG. 14 is a sectional view showing the constitution of a reflecting telescopic lens barrel according to a second embodiment.

FIG. 14 is a sectional view taken along the optical axis of a reflecting telescopic lens barrel of a second embodiment according to the present invention in which numeral 71 designates a fixed tube, numeral 72 designates a first lens and numeral 73 designates a first lens holder holding the first lens, which is fixed to the fixed tube 71. Numeral 74 designates a primary mirror having a primary mirror reflecting face 74a (constituting a concave mirror) for reflecting light from an object that is incident on the primary mirror after passing through the first lens 72. Numeral 75 designates a primary mirror holder for holding the primary mirror 74 and a rear extended portion thereof, is fixed to the fixed tube 71 and also to a lens mounting unit 76.

Numeral 81 designates a secondary mirror having a secondary mirror reflecting face 81a (constituting a convex mirror) for reflecting light from object that is reflected from the main mirror 74, which is held by a secondary mirror holder 84. The secondary mirror holder 84 is driven by a piezoelectric actuator, mentioned later, where focusing (in-focus operation) is performed.

Numeral 77 designates a second lens, numeral 78 designates a third lens arranged on the image plane side, numeral 95 designates a drive circuit driving the piezoelectric element 82a and numeral 96 designates an electric wiring between the piezoelectric element 82a and the drive circuit 95.

Numeral 82 designates a piezoelectric actuator moving the secondary mirror holder 84 of which construction and operation are similar to those explained in FIG. 1 and FIG. 2. In FIG. 14, notation 82a designates a piezoelectric element, notation 82b designates a drive shaft, notation 82c designates a frame and notation 83a designates a moving member to which the secondary mirror holder 84 is fixed by pertinent means, not shown. The frame 82c is fixed to a supporting member 79 provided at the back side of the first lens 72 by pertinent means. An explanation will be given later of a detailed structure of the piezoelectric actuator.

Figure 15:
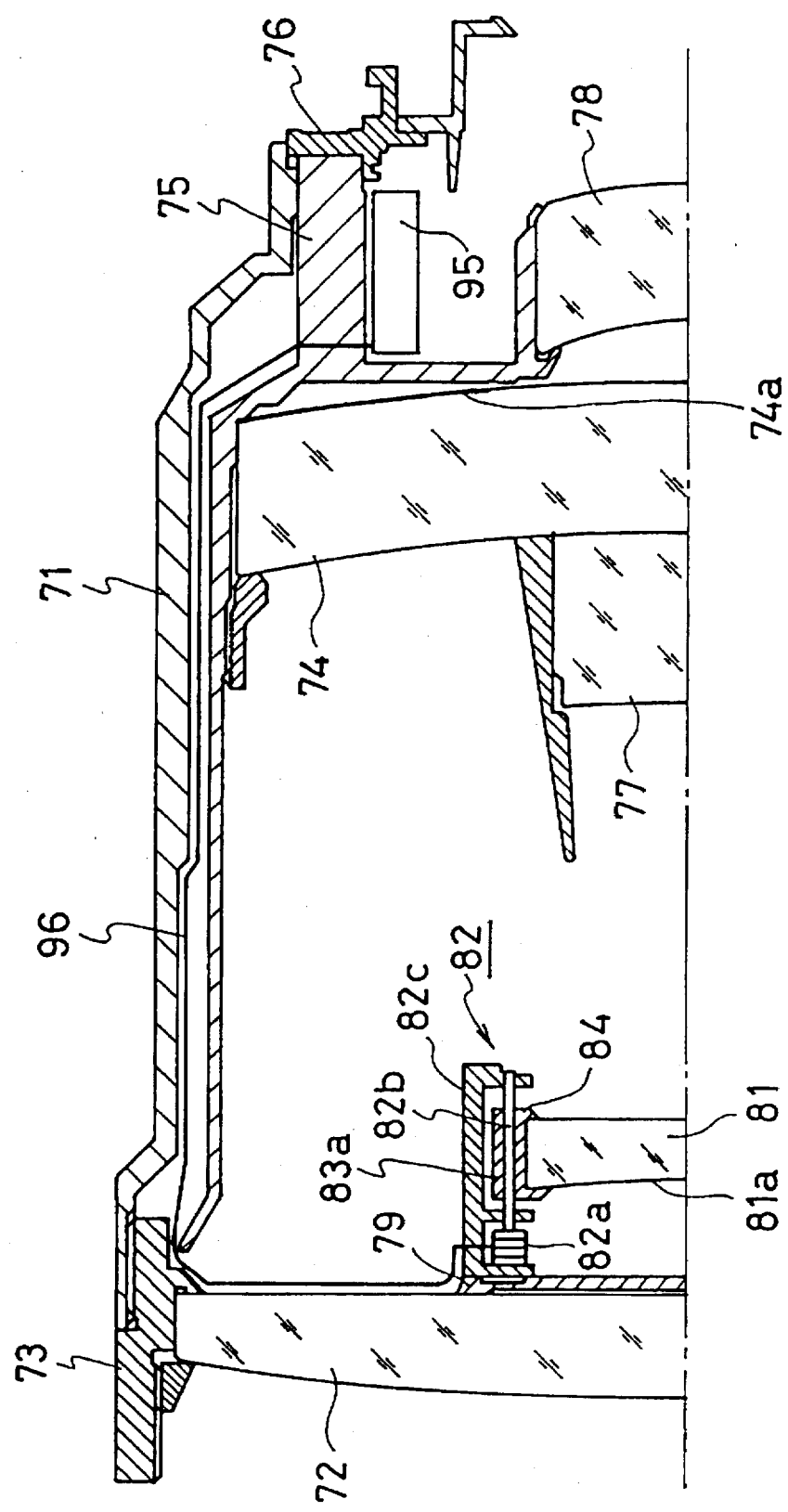
FIG. 15 is a sectional view showing the constitution of a reflecting telescopic lens barrel according to a third embodiment.

FIG. 15 is a sectional view of a third embodiment of the present invention that is taken along the optical axis of a reflecting telescopic lens barrel. The difference thereof from the second embodiment resides in that the direction of the piezoelectric actuator 82 for moving the secondary mirror 81 is reversed and the piezoelectric element 82a is arranged on the side of the first lens 72. The structure of the piezoelectric actuator 82 and the structure of the lens barrel are not different from those in the second embodiment and accordingly, the same portions are attached with the same notations and their explanation will be omitted.

Figure 16:
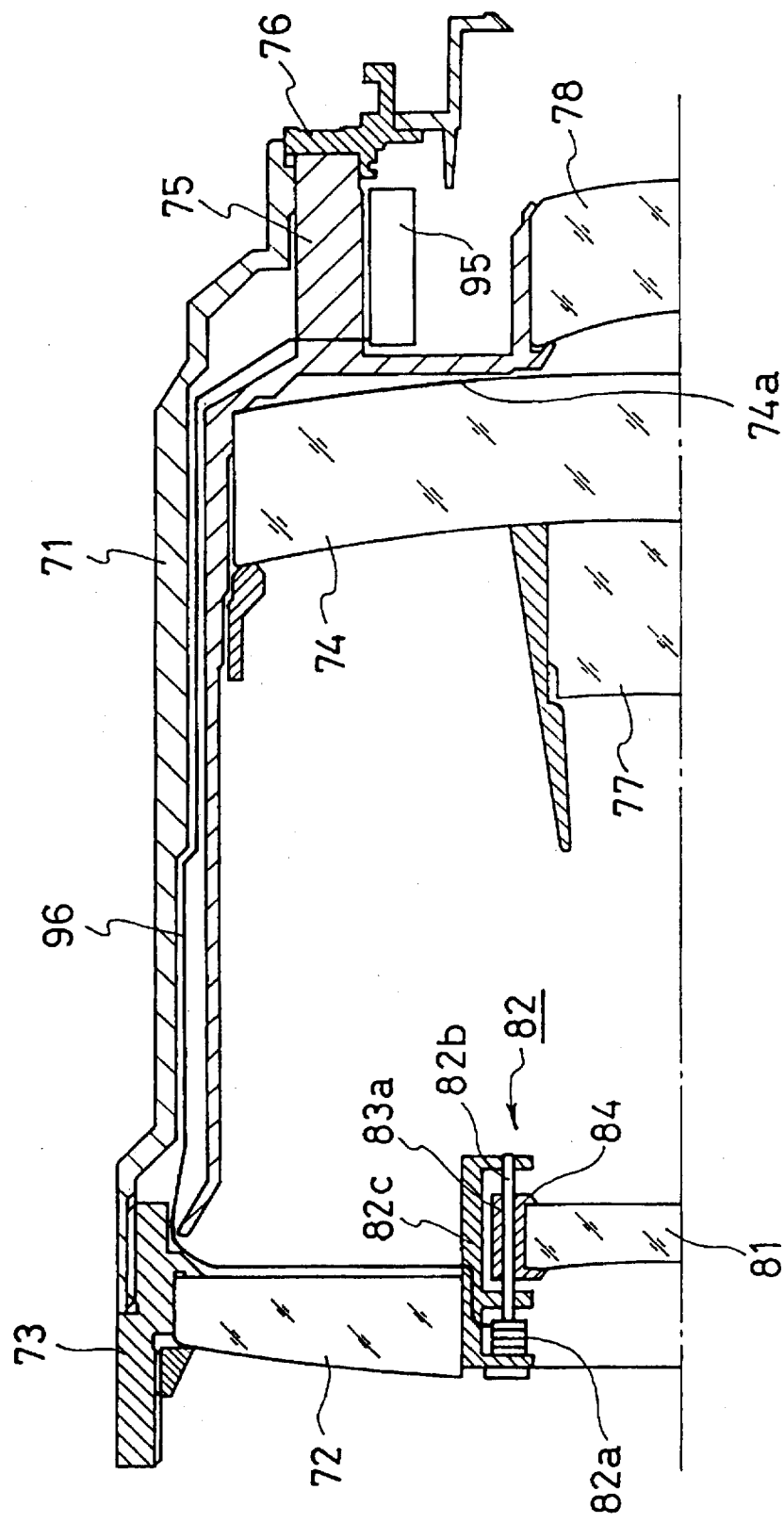
FIG. 16 is a sectional view showing the constitution of a reflecting telescopic lens barrel according to a fourth embodiment.

FIG. 16 is a sectional view of a fourth embodiment of the present invention that is taken along the optical axis of a reflecting telescopic lens barrel. The difference thereof from the second embodiment resides in that the central portion of the first lens 72 is hollowed-out and the secondary mirror 81 and the piezoelectric actuator 82 for moving the secondary mirror 81 are arranged at the central portion of the hollowed-out first lens 72. The structure of the piezoelectric actuator 82 and the structure of the lens barrel are not different from those in the second embodiment and accordingly, the same portions are attached with the same notations and their explanation will be omitted.

Figure 17:
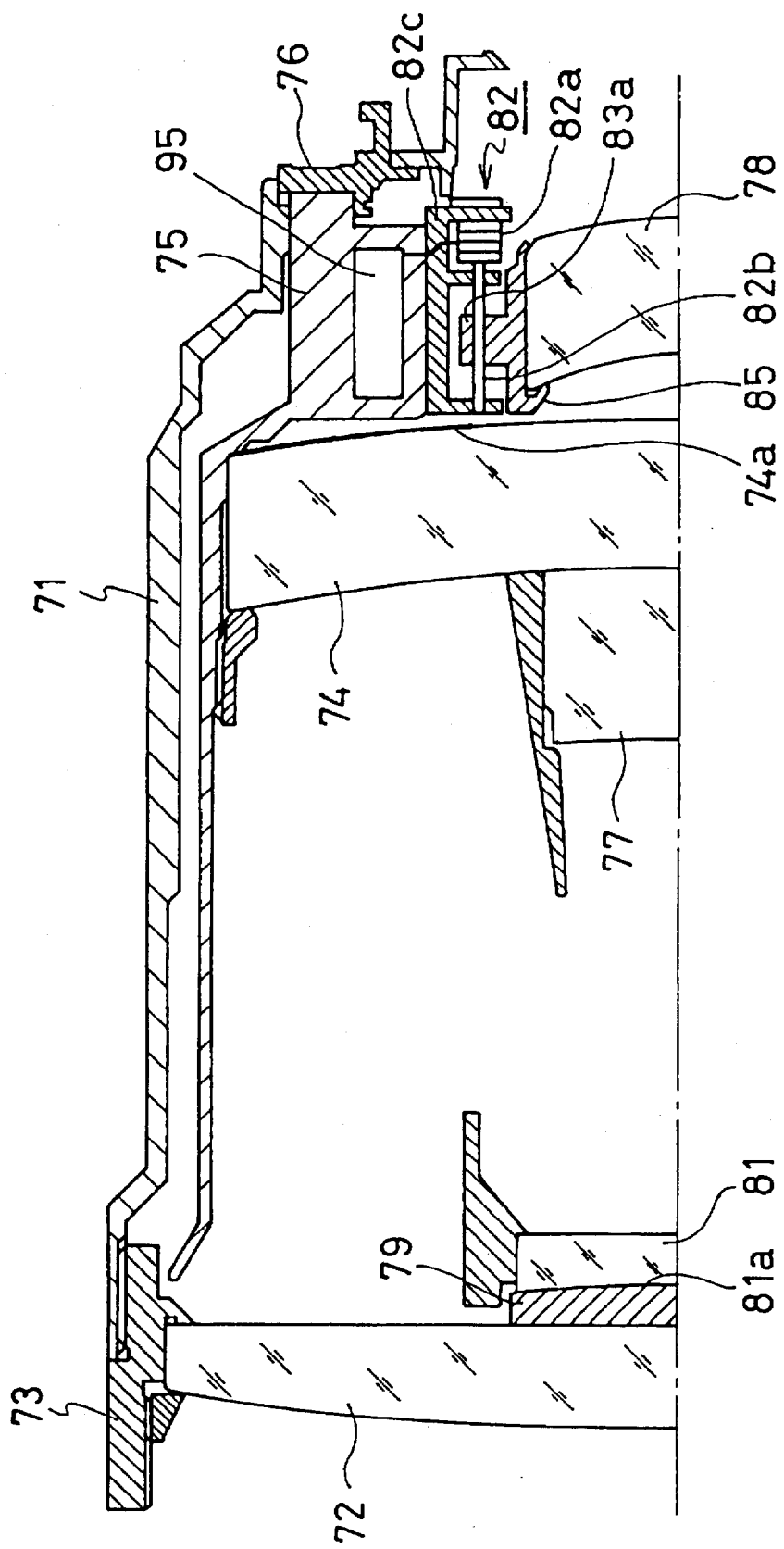
FIG. 17 is a sectional view showing the constitution of a reflecting telescopic lens barrel according to a fifth embodiment.

FIG. 17 is a sectional view of a fifth embodiment of the present invention that is taken along the optical axis of a reflecting telescopic lens barrel. The difference thereof from the second embodiment resides in that the focusing (in-focus operation) is conducted by driving a lens holder 85 of the third lens 78 that is arranged on the image plane side by the piezoelectric actuator 82. The frame 82c of the piezoelectric actuator 82 is fixed to the main mirror holder 75. The secondary mirror 81 is fixed to the supporting member 79 provided at the back side of the first lens 72. The structure of the piezoelectric actuator 82 and the structure of the lens barrel except the above-mentioned are not different from those in the second embodiment and accordingly, the same portions are attached with the same notations and their explanation will be omitted.

Figure 18:
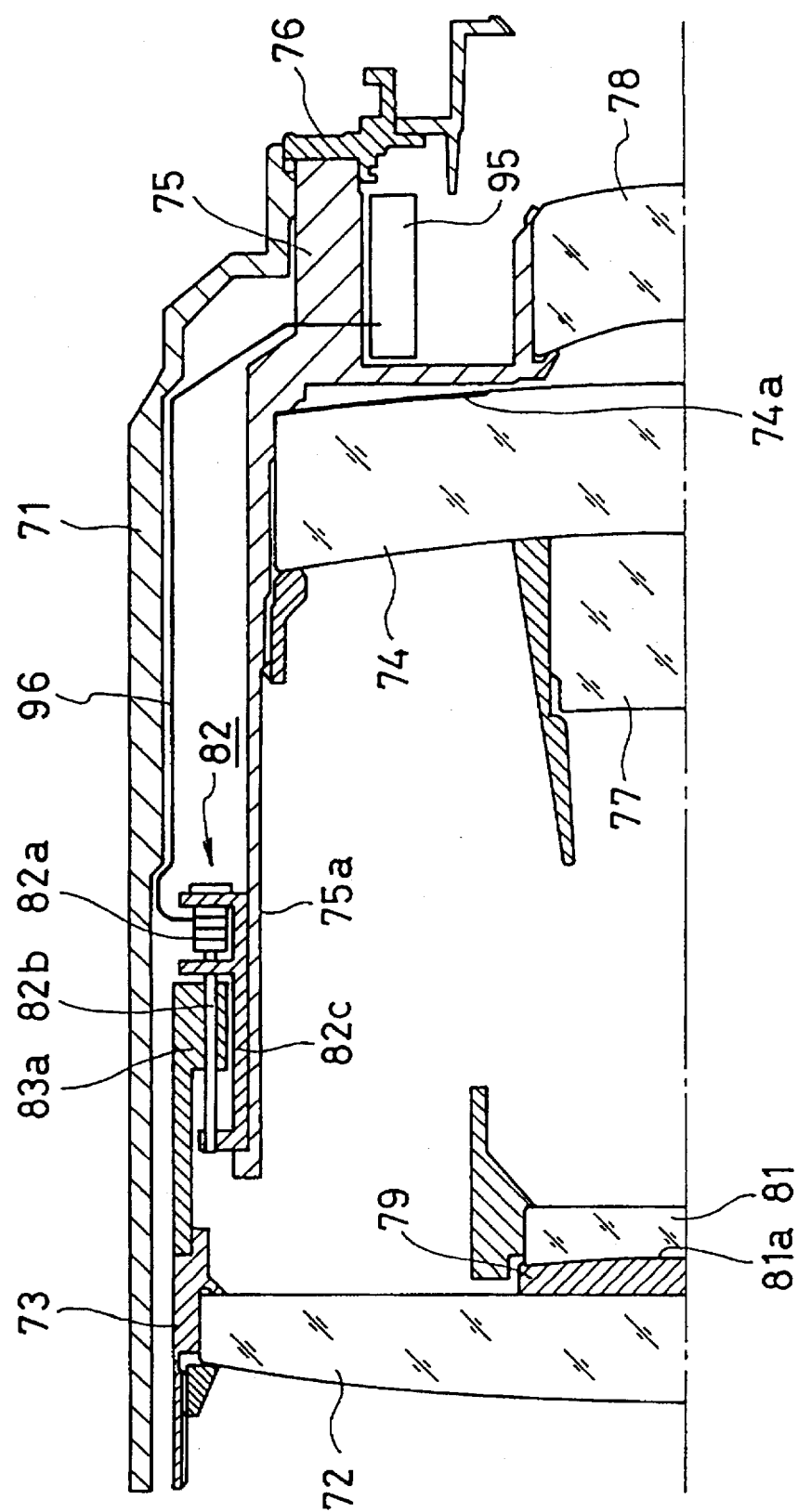
FIG. 18 is a sectional view showing the constitution of a reflecting telescopic lens barrel according to a sixth embodiment.

FIG. 18 is a sectional view of a sixth embodiment of the present invention that is taken along the optical axis of a reflecting telescopic lens barrel. The difference thereof from the second embodiment resides in that the focusing (in-focus operation) is conducted by driving the first lens 72 on the object side and the secondary mirror 81 that is fixed to the supporting member 79 provided at the back side of the first lens 72 by means of the piezoelectric actuator 82.

The frame 82c of the piezoelectric actuator 82 is fixed to an extended portion 75a of the main mirror holder 75 that is extended along the optical axis direction and the lens holder 73 of the first lens 72 is fixed to an extended portion of the moving member 83a of the piezoelectric actuator 82. The structure of the piezoelectric actuator 82 and the structure of the lens barrel except the above-mentioned are not different from those in the second embodiment and accordingly, the same portions are attached with the same notations and their explanation will be omitted.

An explanation will be given of a detailed structure of the piezoelectric actuator that is suitable for the reflecting telescopic lens barrels in the second embodiment through the sixth embodiment in reference to FIG. 19 and FIG. 20 through FIG. 22.

Figure 19:
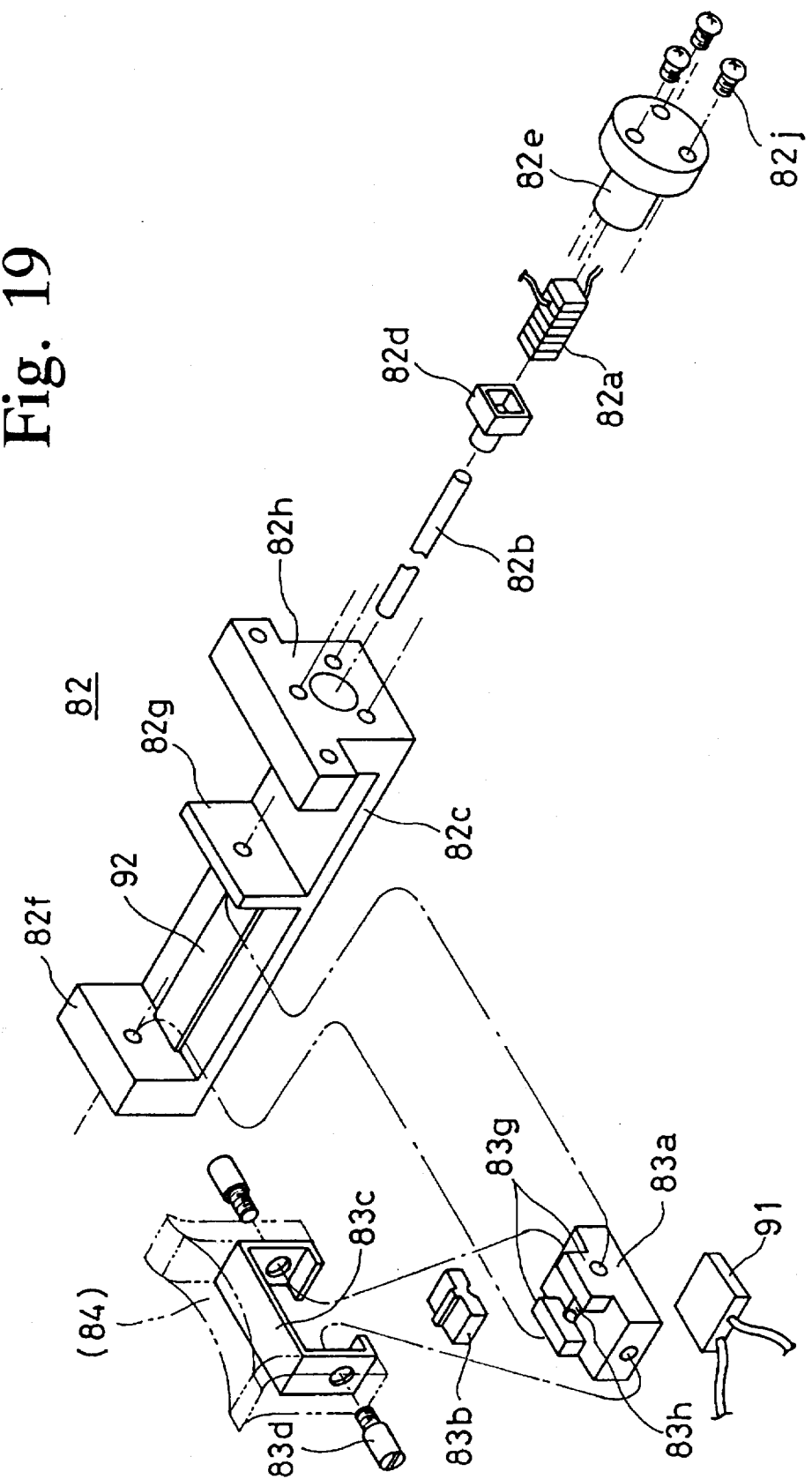
FIG. 19 is a perspective view showing an exploded state of a piezoelectric actuator suitable for the second embodiment through the sixth embodiment.

FIG. 19 is a perspective view showing an exploded state of the piezoelectric actuator 82. In FIG. 19 the frame 82c is provided with supporting members 82f, 82g and 82h and the drive shaft 82b is supported by the supporting members 82f and 82g movably in the axial direction. An end of the piezoelectric element 82a is fixedly adhered to an end of the drive shaft 82b via a member 82d, the other end of the piezoelectric element 82a is fixedly adhered to a member 82e and the member 82e is fixed to the supporting member 82h by small screws 82j.

The moving member 83a is provided with left and right rise portions 83g and a contact portion 83h of which central section has a semicircular groove and the drive shaft 82b penetrates the rise portions 83g and the lower half of the drive shaft 82b is brought into contact with the semicircular groove of the contact portion 83h. Further, a pad 83b is arranged on the upper side of the contact portion 83h and is brought into contact with the upper half of the drive shaft 82b. An elastic member 83c which is fixed to the moving member 83a by small screws 83d is arranged above the pad 83b, the pad 83b is pressed to contact the drive shaft 82b by an urging force of the elastic member 83c whereby the drive shaft 82b, the moving member 83a and the pad 83b are brought into contact by generating a pertinent frictional force among them.

In the cases of the second embodiment as illustrated in FIG. 14, the third embodiment as illustrated in FIG. 15 and the fourth embodiment as illustrated in FIG. 16, the secondary mirror holder 84 is fixed to the moving member 83a by the small screws 83d for fixing the elastic member 83c or by pertinent means, not shown. Further, in the case of the fifth embodiment as illustrated in FIG. 17, the third lens holder 85 is fixed to the moving member 83a by the small screws 83d for fixing the elastic member 83c or pertinent means, not shown.

Also, a magnetic resistance element 91 of a MR sensor for detecting the position of the moving member 83a is fixed to the back face of the moving member 83a, a magnetizing rod 92 is fixed to the frame 82c of the actuator whereby the position of the secondary mirror or the lens is detected by the MR sensor constituted by the magnetic resistance element 91 and the magnetizing rod 92.

Figure 20:
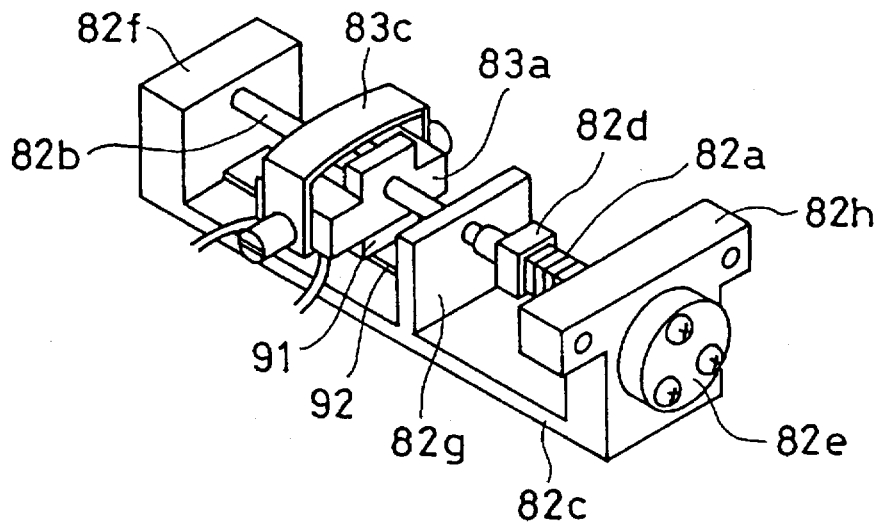
FIG. 20 is a perspective view showing an integrated state of the piezoelectric actuator in FIG. 19.
Figure 21:
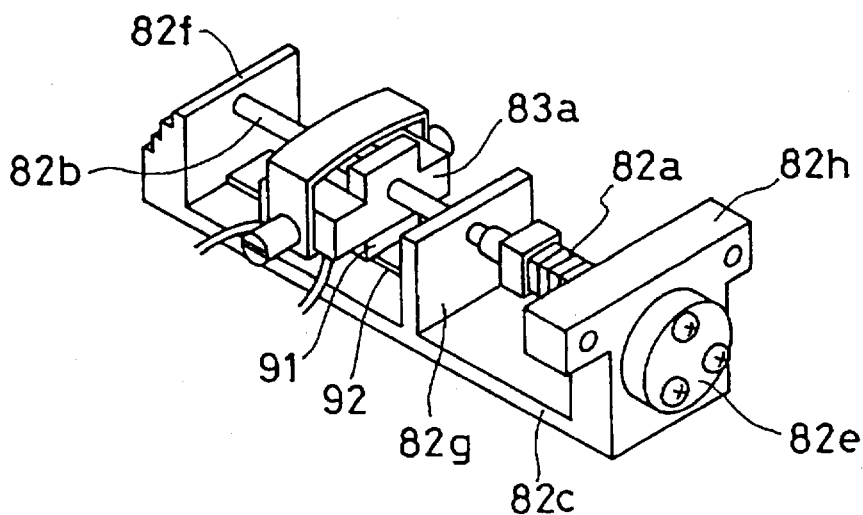
FIG. 21 is a perspective view showing a modified example of the piezoelectric actuator in FIG. 20.
Figure 22:
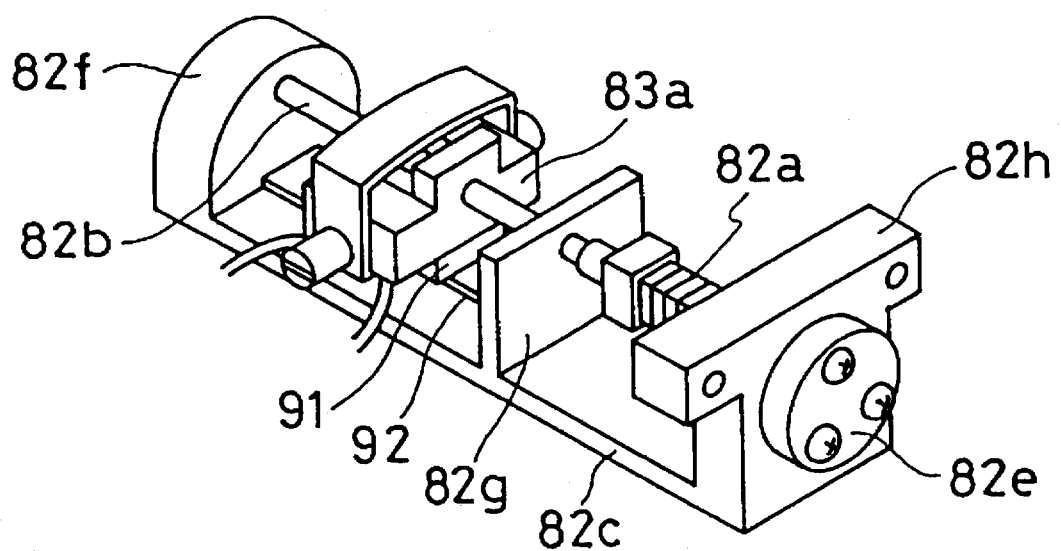
FIG. 22 is a perspective view showing another modified example of the piezoelectric actuator in FIG. 20.

FIG. 20 through FIG. 22 are perspective views showing outlook of integrated state of actuators illustrated in FIG. 19 where more or less modification is applied to the shape of the supporting member 82f on the frame 82c.

With respect to the actuator as illustrated in FIG. 20 the supporting member 82f on the frame 82c comprises a rectangular block. This actuator is suitable for the second embodiment illustrated in FIG. 14 and the supporting member 82f is provided with an external end face having a wide area that is suitable for fixing to the supporting member 79 installed at the back side of the first lens 72. Also, this actuator is suitable for the fifth embodiment illustrated in FIG. 17 and the sixth embodiment illustrated in FIG. 18.

With respect to the actuator illustrated in FIG. 21 the difference thereof from the actuator illustrated in FIG. 20 resides in that the external end face of the supporting member 82f is formed in a step-like shape. When this actuator is arranged such that the supporting member 82f of the actuator 82 is disposed on the side of the primary mirror 74 as in the third embodiment illustrated in FIG. 15 and the fourth embodiment illustrated in FIG. 16, a range by which optical path reflected by the primary mirror 74 and is incident on the secondary mirror 81 is blocked (kicked) can be reduced.

With respect to the actuator illustrated in FIG. 22 the difference thereof from the actuator illustrated in FIG. 20 resides in that the external end face of the supporting member 82f is formed in an approximately semicircular shape. When the actuator is arranged such that the supporting member 82f of the actuator 82 is disposed on the side of the primary mirror 74 as in the third embodiment illustrated in FIG. 15 and the fourth embodiment illustrated in FIG. 16, a range by which optical path reflected by the primary mirror 74 and is incident on the secondary mirror 81 is blocked can be reduced.

Although the external end face of the supporting member 82f is formed in a step-like shape or an approximately semicircular shape in the actuators in FIG. 21 and FIG. 22, the supporting member 82h may be formed in a step-like shape or an approximately semicircular shape. In this constitution, when the supporting member 82h of the actuator 82 is arranged to dispose on the side of the primary mirror 74 as in the second embodiment in FIG. 14, a range by which optical path reflected by the primary mirror 74 and incident on the secondary mirror 81 is blocked can be reduced.

Further, other than the actuators in which the supporting member 82f on the frame 82c is formed in a step-like shape or an approximately semicircular shape as shown by FIG. 21 and FIG. 22, the range by which optical path reflected by the primary mirror 74 and incident on the secondary mirror 81 is blocked can be reduced by rendering the height of the supporting member 82f or the supporting member 82h disposed on the side of the primary mirror 74, in the actuator arranged inside of the lens barrel, gradually lower toward the external side of the frame 82c, or rendering a total thereof as low as possible and the area thereof as small as possible.

Figure 23:
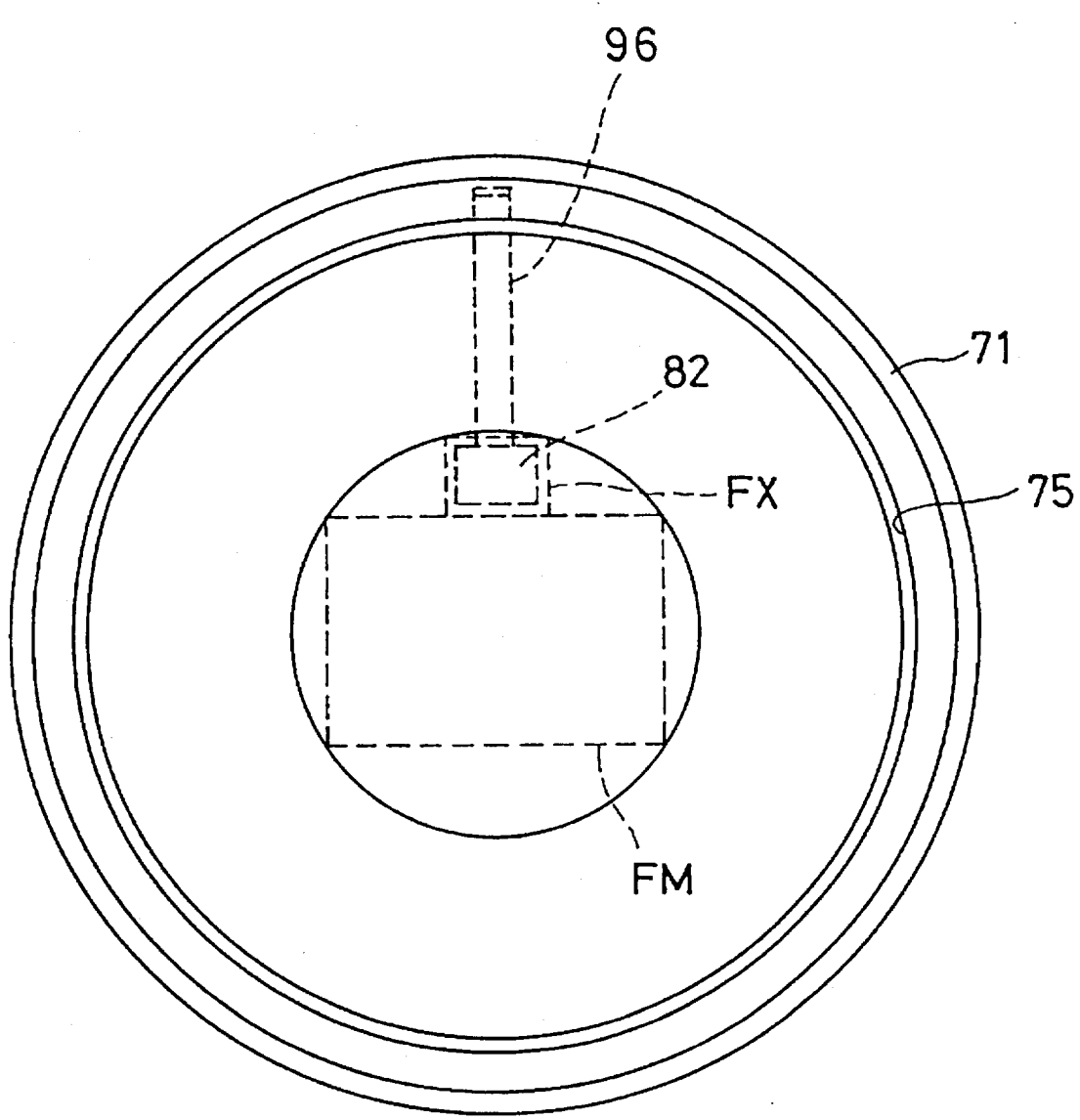
FIG. 23 is a diagram explaining an optical path passing range in a lens corresponding to a photographic field of view of a camera.
Figure 24:
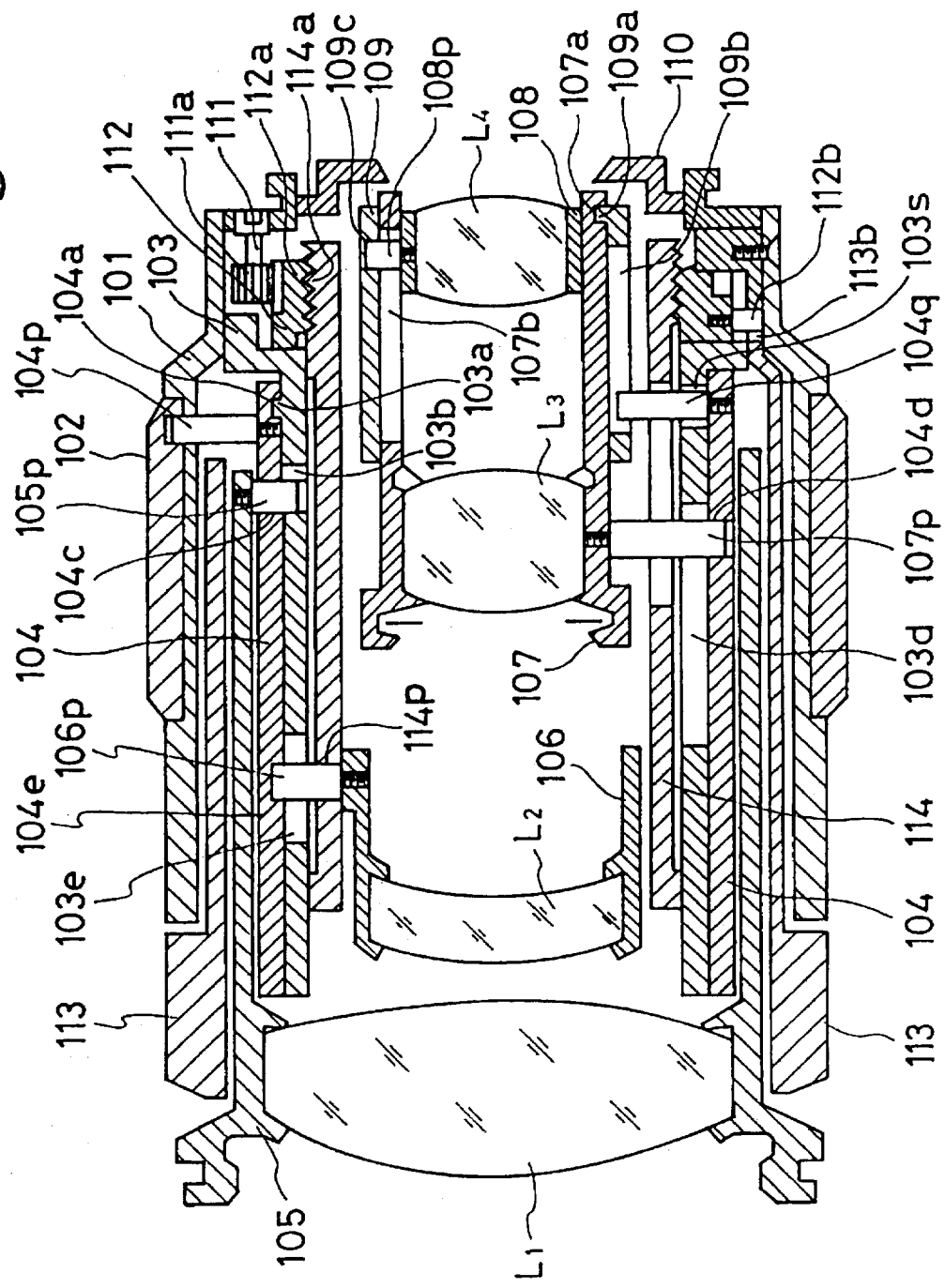
FIG. 24 is a sectional view showing the constitution of a conventional zoom lens barrel.

Concerning the second embodiment in FIG. 14 through the fourth embodiment in FIG. 16, it is possible that optical path reflected by the primary mirror 74 and incident on the secondary mirror 81 is not blocked by the actuator 82 by arranging the actuator 82 to dispose at an external side FX with regards to a frame (vision field frame) FM indicating a range for passing optical path in the lens corresponding to the photographic field of view of a camera as shown by FIG. 23. Incidentally, it is preferable to place the actuator 82 on the short side of the above-mentioned frame FM since vacant space is larger on the short side than on the long side.

Next, an explanation will be given of the arrangement of the drive circuit driving the actuator in the lens barrel and the arrangement of an electric wiring between the drive circuit and the piezoelectric element of the actuator.

Figure 25:
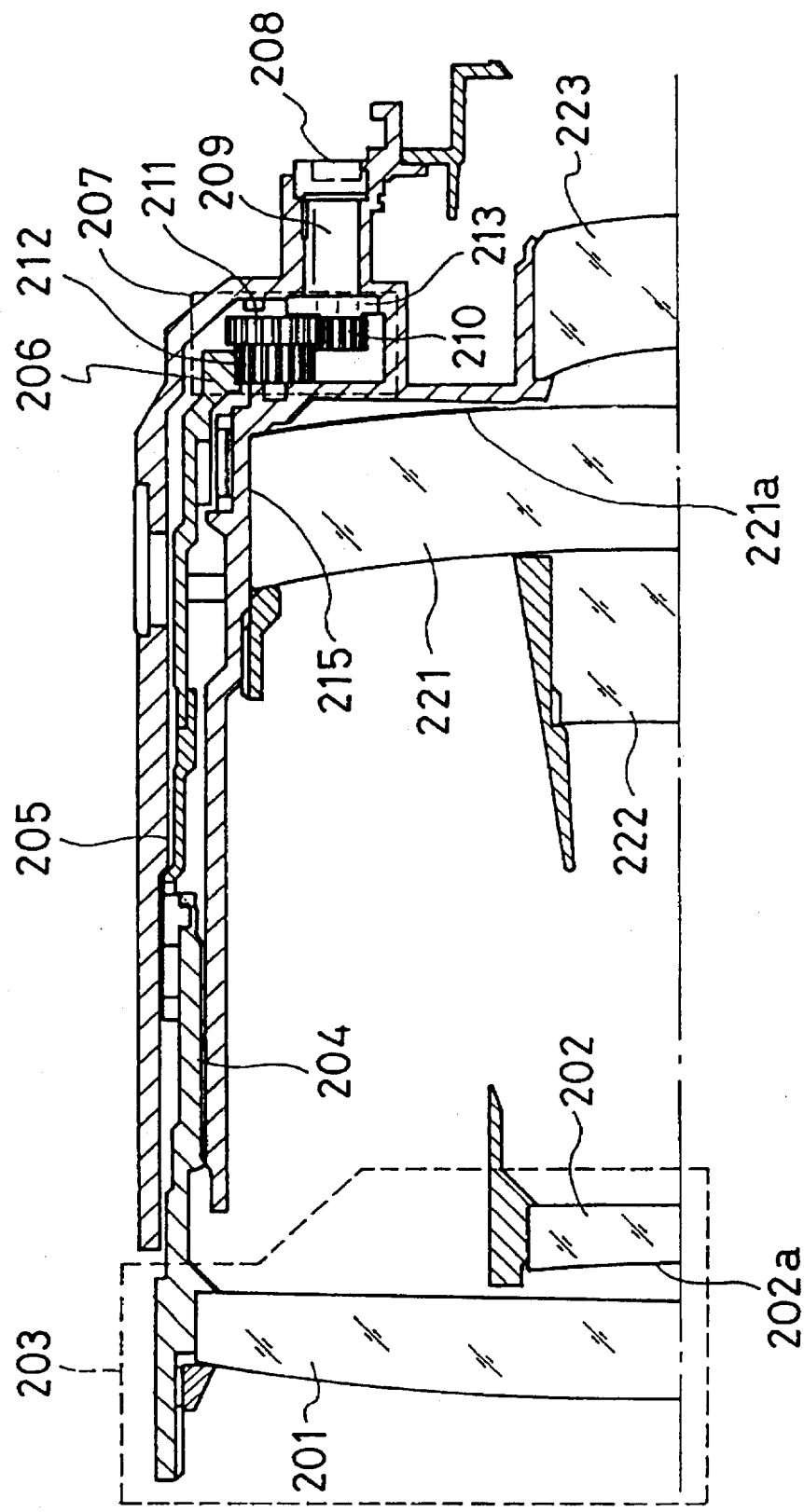
FIG. 25 is a sectional view showing the constitution of a conventional reflecting telescopic lens barrel.

In the conventional reflecting telescopic lens barrel the reduction gear mechanism 207 is provided in the vicinity of the lens mounting unit as shown by FIG. 25. In this invention such a reduction gear mechanism is not necessary and accordingly, the drive circuit driving the actuator is arranged at a space portion where the reduction gear mechanism has been removed.

Furthermore, the actuator 82 is arranged to dispose at the external side FX from the frame (vision field frame) FM indicating a range for passing optical path in the lens corresponding to the photographic field of vision in a camera as illustrated in FIG. 23, in the second embodiment of FIG. 14 through the fourth embodiment of FIG. 16 and accordingly, the electric wiring 96 between the drive circuit 95 and the piezoelectric element 82a is connected to the drive circuit 95 via the external side of the frame and via the inner face of the fixed tube 71.

The electric wiring 96 is formed by a flexible printed board in which transparent leads are printed on a flexible transparent film and of which surface is subjected to a reflection preventive treatment, or a flexible printed board in which leads are printed on a flexible film and of which surface is subjected to a black color reflection preventive treatment etc.

Moreover, when the electric wiring 96 is disposed at a position crossing optical path in the lens barrel, the film face on which the electric wiring is formed is arranged to be in parallel with optical path by which the optical path blocked by the electric wiring 96 is minimized.

The control circuit and the control operation focusing the lens to the object are the same as those in the first embodiment which has been explained previously in reference to FIG. 13 and therefore, the explanation will be omitted here. However, the focus cam ring 13 in FIG. 13 corresponds to the secondary mirror holder 84 in the second embodiment through the fourth embodiment, the lens holder 85 of the third lens 78 in the fifth embodiment and the lens frame 73 of the first lens 72 in the sixth embodiment and accordingly, this portion of the lens barrel must be interpreted by such substitution.

As has been explained, according to the present invention, in a lens barrel conducting focusing operation by moving in the optical axis direction lenses contributing to the focusing operation among lenses constituted by a plurality of lens sets by means of an actuator arranged in the lens barrel, the actuator is constituted by a piezoelectric element, a drive member arranged along the optical axis direction and connected to the piezoelectric element for displacing together with the piezoelectric element, a moving member connected with a support frame of the lens sets contributing to the focusing operation and friction-coupled to the drive member and a supporting member supporting the drive member movably in the optical axis direction.

The supporting member for supporting the drive member is constituted such that the height in the direction intersecting with the optical axis direction is lowered toward the exterior side of the actuator, or a section thereof orthogonal to the axial direction of the drive member is made approximately semicircular. Also, when the actuator is arranged in the lens barrel, it is arranged such that the piezoelectric element is disposed on the object side and the drive member is disposed on the image plane side and further arranged at the external side of a range for passing optical path in the lens corresponding to the photographic field of view. Additionally, the drive member is preferably arranged at the external side on the short side of the range for passing optical path.

Thereby, not only there is no concern of blocking optical path incident on (or reflected by) the lens by the actuator, but also effects in which the drive mechanism of the lens sets can be simplified without using the complicated construction in which the rotational motion of a helicoidal ring etc. is converted into the motion in the optical axis direction by helicoidal screws as in the conventional lens, a number of parts is reduced and the weight is reduced, can be provided.

According to the present invention, a gear drive mechanism arranged at the rear portion of the lens barrel occupying a large space in the conventional lens barrel can be dispensed with and therefore, the actuator drive circuit can be arranged at the space portion whereby the actuator drive circuit can be accommodated without enlarging the outer dimensions of the lens barrel.

Additionally, the electric wiring connecting the actuator with a drive circuit is a flexible printed board which is formed by printing leads on a transparent film and accordingly, when it is disposed at a position crossing optical path at the inside of the lens barrel, the range of blocked optical path can be minimized by arranging the film face in parallel with the optical path.

It is further understood by those skilled in the art that the foregoing description is a preferred embodiment of the disclosed device and that various changes and modifications may be made in the invention without departing from the spirit and scope thereof.

What is claimed is:

1. A lens barrel performing a focusing operation by moving a lens in an optical axis direction by means of an actuator in the lens barrel, said lens contributing to the focusing operation among a plurality of lenses, said actuator comprising:

a piezoelectric element;

a moving member holding the lens contributing to the focusing operation and connected to the piezoelectric element for moving the lens contributing to the focusing operation in the optical axis direction by a displacement caused in the piezoelectric element; and a supporting unit supporting the piezoelectric element and the moving member;

wherein said supporting unit is arranged along the optical axis direction and an end portion of the supporting unit in the optical axis direction has a shape which is inclined such that a height of the end portion decreases from an inner side of the supporting unit toward an outer side thereof.

2. A lens barrel according to claim 1, further comprising a drive circuit causing the displacement in the piezoelectric element.

3. A lens barrel according to claim 2, wherein said drive circuit is arranged on an image plane side in the lens barrel.

4. A lens barrel according to claim 2, wherein said piezoelectric element is displaced by a voltage applied by the drive circuit, an end of the piezoelectric element is a fixed end fixedly supported by the supporting unit, the other end of the piezoelectric element is a free end displaceable by the applied voltage and said moving member is connected to the free end.

5. A lens barrel according to claim 1, wherein the end portion of said supporting unit in the optical axis direction is stepped to provide said shape which decreases from the inner side thereof to the outer side thereof.

6. A lens barrel according to claim 1, wherein in the supporting unit arranged along said optical axis direction for supporting the piezoelectric element and the moving member, the piezoelectric element is arranged on an object side and the moving member is arranged on an image plane side.

7. A lens barrel according to claim 6, wherein said supporting unit is arranged on an outside of an optical path passing range in the lenses corresponding to a photographic field of view.

8. A lens barrel performing a focusing operation by moving a lens in an optical axis direction by means of an actuator in the lens barrel, said lens contributing to the focusing operation among a plurality of lenses, said actuator comprising:

a piezoelectric element;

a moving member holding the lens contributing to the focusing operation and connected to the piezoelectric element for moving the lens contributing to the focusing operation in the optical axis direction by a displacement caused in the piezoelectric element; and a supporting unit supporting the piezoelectric element and the moving member;

wherein said supporting unit is arranged along the optical axis direction and an end portion of the supporting unit in the optical axis direction has an approximately semicircular shape.

9. A lens barrel according to claim 8, further comprising a drive circuit causing the displacement in the piezoelectric element.

10. A lens barrel according to claim 9, wherein said drive circuit is arranged on an image plane side in the lens barrel.

11. A lens barrel according to claim 9, wherein said piezoelectric element is displaced by a voltage applied by the drive circuit, an end of the piezoelectric element is a fixed end fixedly supported by said supporting unit, the other end of the piezoelectric element is a free end displaceable by the applied voltage and said moving member is connected to the free end.

12. A lens barrel according to claim 8, wherein an end of said supporting unit in the optical axis direction has a reflection preventive treatment on a surface thereof.

13. A lens barrel according to claim 8, wherein in the supporting unit arranged along said optical axis direction for supporting the piezoelectric element and the moving member, the piezoelectric element is arranged on an object side and the moving member is arranged on an image plane side.

14. A lens barrel according to claim 13, wherein said supporting unit is arranged on an outside of an optical path passing range in the lenses corresponding to a photographic field of view.

15. A lens barrel performing a focusing operation by moving a lens in an optical axis direction by means of an actuator in the lens barrel, said lens contributing to the focusing operation among a plurality of lenses, said actuator comprising:

a piezoelectric element;

a moving member holding the lens contributing to the focusing operation and connected to the piezoelectric element for moving the lens contributing to the focusing operation in the optical axis direction by a displacement caused in the piezoelectric element;

a drive circuit causing the displacement in the piezoelectric element; and a film type electric wiring electrically connecting the piezoelectric element to the drive circuit;

wherein said electric wiring is arranged such that a film face thereof at a position crossing the optical path in the lens barrel is in parallel with said optical path to minimize a portion of the optical path blocked by the electric wiring.

16. A lens barrel according to claim 15, wherein said electric wiring is a transparent electric wiring printed on a flexible transparent film.

17. A lens barrel according to claim 16, wherein the transparent film on which said electric wiring is printed has a reflection preventive treatment.

18. A reflection type lens barrel projecting a light from an object incident on the lens barrel via a lens on an image plane by reflecting the light by a primary mirror and a secondary mirror, said lens barrel comprising in the lens barrel:

a piezoelectric element;

a drive circuit causing a displacement in the piezoelectric element;

a secondary mirror moving member holding a secondary mirror for moving said secondary mirror in an optical axis direction by the displacement of the piezoelectric element caused by driving the drive circuit, said secondary mirror moving member being connected to the piezoelectric element; and a supporting unit integrally supporting the piezoelectric element and the secondary mirror moving member;

wherein in said supporting unit, the piezoelectric element is arranged on an object side and the secondary mirror moving member is arranged on an image plane side along the optical axis direction and an end of the supporting unit on the image plane side in the optical axis direction is formed in an inclined shape such that an optical path whereby the light from the object reflected by the primary mirror reaches the secondary mirror is not blocked.

19. A lens barrel according to claim 18, wherein said drive circuit is arranged on the image plane side of the primary mirror.

20. A lens barrel according to claim 19, wherein said piezoelectric element is electrically connected to said drive circuit by a transparent electric wiring printed on a flexible transparent film and a reflection preventive treatment is provided on the transparent film.

21. A lens barrel according to claim 20, wherein said electric wiring connecting the piezoelectric element to the drive circuit is arranged such that a film face thereof is in parallel with said optical path when the electric wiring is at a position crossing the optical path in the lens barrel to minimize a portion of the optical path blocked by the electric wiring.

* * * * *